(12) United States Patent
Check et al.

(10) Patent No.: US 7,136,954 B2
(45) Date of Patent: Nov. 14, 2006

(54) DATA COMMUNICATION METHOD AND APPARATUS UTILIZING CREDIT-BASED DATA TRANSFER PROTOCOL AND CREDIT LOSS DETECTION MECHANISM

(75) Inventors: Mark Anthony Check, Hopewell Junction, NY (US); Bernard Charles Drerup, Austin, TX (US); Michael Grassi, Shokan, NY (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 11/047,547

(22) Filed: Jan. 31, 2005

(65) Prior Publication Data

US 2006/0174040 A1    Aug. 3, 2006

(51) Int. Cl.
*G06F 13/00* (2006.01)
(52) U.S. Cl. .......................... 710/310; 710/29; 710/311
(58) Field of Classification Search ...................... None
See application file for complete search history.

(56) References Cited

U.S. PATENT DOCUMENTS

| | | | |
|---|---|---|---|
| 5,515,359 A | * | 5/1996 | Zheng ........................ 370/231 |
| 6,044,406 A | | 3/2000 | Barkey et al. |
| 6,249,756 B1 | * | 6/2001 | Bunton et al. ................ 703/25 |
| 6,732,208 B1 | * | 5/2004 | Alsaadi et al. .............. 710/112 |
| 6,760,793 B1 | * | 7/2004 | Kelley et al. ................ 710/52 |
| 2003/0133463 A1 | * | 7/2003 | Lacey, III .................... 370/411 |
| 2005/0228900 A1 | * | 10/2005 | Stuart et al. ................ 709/234 |

* cited by examiner

*Primary Examiner*—Glenn A. Auve
(74) *Attorney, Agent, or Firm*—Roy W. Truelson

(57) ABSTRACT

A communications bus for a digital device includes a credit-based flow control mechanism, in which a sending component maintains a local record of its credits. Credits are returned to the sender by pulsing a single-bit credit return line. A separate mechanism provides a count of available credits from the receiver, the separate mechanism not necessarily being current. The local record is compared to the count of credits from the separate mechanism over a predetermined time interval, failure of the two values to agree at any time during the interval indicating a probable credit discrepancy. A credit discrepancy is confirmed, preferably by suspending certain bus activity for a sufficiently long period to account for any delay in propagating credit value changes, and re-comparing the values. Preferably, the bus communicates between internal components of an integrated circuit chip.

16 Claims, 17 Drawing Sheets

DATA COMMUNICATION METHOD AND APPARATUS UTILIZING CREDIT-BASED DATA TRANSFER PROTOCOL AND CREDIT LOSS DETECTION MECHANISM

CROSS REFERENCE TO RELATED APPLICATIONS

The present application is related to the following commonly assigned copending applications filed on the same date as the present application, all of which are incorporated by reference:

application Ser. No. 11/047,549, entitled "Internal Data Bus Interconnection Mechanism Utilizing Shared Buffers Supporting Communication Among Multiple Functional Components of an Integrated Circuit Chip";

application Ser. No. 11/047,522, entitled "Internal Data Bus Interconnection Mechanism Utilizing Central Interconnection Module Converting Data in Different Alignment Domains"; and application Ser. No. 11/047,548, entitled "Data Communication Method and Apparatus Utilizing Programmable Channels for Allocation of Buffer Space and Transaction Control".

FIELD OF THE INVENTION

The present invention relates to digital data processing hardware, and in particular to the design and operation of data interfaces for transferring data between different components of a digital data processing device.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modem computer system is an enormously complex machine, usually having many sub-parts or subsystems, each of which may be concurrently performing different functions in a cooperative, although partially autonomous, manner. Typically, the system comprises one or more central processing units (CPUs) which form the heart of the system, and which execute instructions contained in computer programs. Instructions and other data required by the programs executed by the CPUs are stored in memory, which often contains many heterogenous components and is hierarchical in design, containing a base memory or main memory and various caches at one or more levels. At another level, data is also stored in mass storage devices such as rotating disk drives, tape drives, and the like, from which it may be retrieved and loaded into memory. The system also includes hardware necessary to communicate with the outside world, such as input/output controllers; I/O devices attached thereto such as keyboards, monitors, printers, and so forth; and external communication devices for communicating with other digital systems.

Each component of a digital computer system is itself a very complex instrument, having a design hierarchy which can mimic that of the system. For example, a disk drive storage device typically contains one or more spinning disks on which data is recorded, an actuator and transducers for accessing data on the disk, a central controller which executes a control program for controlling the operation of the device, motors for driving the spinning disk and the mechanical actuator, various drivers for the motor, actuator and transducer, sense amplification electronics for reading the transducer, internal communications interfaces among the various components, and an external communications interface for communicating data with the outside world. Within any such component, further design hierarchies may exist.

Although a general-purpose computer can be programmed to perform a variety of different tasks, the range of applications and environments in which computer systems and other digital devices will be used creates a demand for devices of differing sizes and configurations. Some computer systems are used primarily as servers, in which multiple users (who may be geographically isolated, using a heterogeneous mixture of computer systems and application software) access a centralized set of applications and common database. Other computer systems are used primarily as single-user devices, in which a single user performs a set of applications of interest to the user, locally stores data of interest to the user, and may optionally communicate with other computers as required to access external data. Still other computer systems may perform specialized functions, such as monitoring and controlling physical sensors, switches, motors, valves, and other controls. A special-purpose digital device may or may not even be considered a computer system, but contains many of the design attributes of a general-purpose computer system.

Many digital system components are implemented on integrated circuit chips. Improvements in the manufacture and design of integrated circuitry have made it possible to place a very large number of active devices, such as transistors, on a single integrated circuit chip. This in turn makes it possible for a single chip to perform complex functions of a digital device. For some years now, it has been possible to implement a complete CPU on a single integrated circuit chip, and more recent CPUs contain on-chip caches and other components. Other integrated circuit chips are used to perform custom functions, such as memory device controllers, I/O device controllers, bus controllers, adapters and repeaters, and so forth In any computer system or other digital device, there is a need to provide communications paths, generally called buses, for interconnecting various components of the system. Buses can be used to provide communications among different integrated circuit chips, or among different internal components of a single integrated circuit chip. The characteristics of these buses vary depending on the uses to which they will be put. For example, the volume of data traversing a bus, the physical length of the bus, the types of devices attached to the bus, and so forth will affect bus design.

Because many different types of devices may be attached to a bus, each operating at a different speed, performing a different function and located in a different location, a bus generally provides a flow control mechanism which prevents data from being sent by a first device when a second device is not ready. For example, a flow control mechanism may be a "not ready" signal that indicates the receiving device is not ready to receive data, or a "retry" signal that rejects data transactions the receiver can not accept.

One known form of flow control mechanism is a credit-based control mechanism, whereby a sending device receives an allocation of credits to transmit data on the bus. Credits may represent buffer capacity in the receiver, or some other form of capability of the receiver to receive data. When the sender transmits data on the bus, it decrements its allocation of credits. When the receiver restores the capacity to receive additional data, it returns the credit to the sender. The sender is thus allowed to transmit data immediately on the bus, without asking permission of the receiver, so long as it has credits available. If the sender ever runs out of credits, it is temporarily prevented from sending additional data to the receiver.

The purpose of a credit-based mechanism would be defeated if the sender had to ask the receiver for the number of available credits each time it wished to transmit. Therefore, when using a credit-based flow control mechanism, the sender maintains a local record of the number of credits available. This record is continually being updated as the sender sends data on the bus (decrementing the number of credits) and the receiver returns credits to the sender (incrementing the number of credits).

Conventionally, credits are returned by the receiver as a single bit credit pulse on a credit return line of the bus. Credits may also be returned by periodic messages from the receiver. For any of various reasons, a discrepancy may arise between the sender's local record of credits available and actual credits available at the receiver, i.e., actual capacity of the receiver to receive additional data. For brevity, such a discrepancy is herein referred to as a credit "loss", it being understood that a discrepancy could also arise as a result of the sender having extra credit in its local record.

In order to correct credit loss, it is known to periodically reset the sender's local record of credits available. For example, a receiver may periodically send a transmission to the sender containing the receiver's credit count. Such a transmission may be sent as an ordinary bus communication having its own command code or type, most buses supporting bi-directional communications. This technique creates a small additional overhead. But more importantly, it is not designed to detect a credit loss—it only sets or resets the credit count to a value obtained from the receiver, whether the sender's local value was incorrect or not.

In some circumstances, it may be desirable to know that a credit loss has occurred. In the case of a chip internal bus, any credit loss is probably indicative of a hardware or design malfunction, which should be recorded and reported. In the case of an external bus, where noise or other factors may be expected to cause occasional credit losses, excessive credit loss may indicate unreliable connections, weak drivers, etc., any of which should be recorded and reported. It would be desirable to provide a means for not only resetting credit values, but for detecting and reporting credit losses in a communications bus, which does not impose an undue overhead on the operation of the bus.

SUMMARY OF THE INVENTION

A communications bus for multiple components of a digital data device includes a credit-based flow control mechanism, in which a sending component maintains a local record of its credits. Credits are returned to the sender for incrementing the local record by pulsing a single-bit credit return line. The local record is compared to at least one separately maintained credit value, preferably by monitoring over at least one respective pre-determined time interval. If the local record never agrees with the count of credits from the separate source at any time during the respective pre-determined time interval, then a probable credit discrepancy has been detected. The bus components can then take some action to confirm the existence of a credit discrepancy, and if the credit discrepancy is confirmed, record the event.

In the preferred embodiment, two separate credit values are independently compared with the local record during two separate time intervals. A first credit value is obtained from a separate mechanism which provides a count of available credits from the receiver, the separate mechanism not necessarily being as current as the sender's local record. A second credit value is obtained from a configuration register as a maximum number of credits available for a particular communications link. The first interval is preferably shorter than the second interval.

In the preferred embodiment, the communications bus is an internal communications bus for communicating between internal functional components of an integrated circuit chip. Each bus connects a respective functional component of the chip to a central interconnect module within the chip. The separate mechanism is preferably a separate set of physical signal lines (referred to as a free credit bus) associated with each bus, the lines transmitting a credit value from a free credit register in the receiver to the sender. The central interconnect module, together with the multiple chip internal buses, forms multiple communications paths among the functional components of the chip. Separate credits are provided for bus communications in either direction on a bus.

In the preferred embodiment, a credit discrepancy is confirmed by suspending certain activity on the bus and again comparing the local record with the separately maintained credit value or values. Bus activity is suspended for a sufficiently long interval to cause the values to agree, if the bus is operating as it should. I.e., in the case of a separately maintained free credit count in the receiver, the interval is sufficiently long to account for any delay in propagating credit value changes in the separate mechanism. In the case of a maximum credit value, the interval is generally longer, being sufficiently long to cause all credits to be returned.

In one aspect of the preferred embodiment of the invention, at least some of the functional components perform different functions, and communicate with the central interconnect via a common generic interface. This generic interface is defined for a family of application specific integrated circuit (ASIC) chip designs. Each design of the family uses an architecturally similar central interconnect module and the generic interface for communicating among multiple functional component modules. However, each design of the family contains a different set of functional component modules.

In the preferred embodiment, the integrated circuit chip is a bridge chip for coupling multiple data buses of a computer system. The functional modules within the chip are data bus interface modules for interfacing with the data buses, the data buses being external to the integrated circuit chip. The use of different functional modules coupled by the central interconnect enables the chip to support communications between buses of different types.

In the preferred embodiment, a central interconnect module of an integrated circuit chip includes a shared buffer which performs buffering functions for the various functional modules which are connected to it, as described and claimed in commonly assigned copending U.S. application Ser. No. 11/047,549, entitled "Internal Data Bus Interconnection Mechanism Utilizing Shared Buffers Supporting Communication Among Multiple Functional Modules of an Integrated Circuit Chip", filed on the same date as the present application, and herein incorporated by reference. However the present invention is not necessarily limited to devices which employ a central interconnect module or a shared buffer mechanism as described.

In the preferred embodiment, bus transactions are allocated to multiple channels, each channel having its own allocation of credits. Multiple channels can be used to control ordering of bus transactions as described and claimed in commonly assigned copending U.S. application Ser. No. 11/047,548, entitled "Data Communication Method and Apparatus Utilizing Programmable Channels for Allocation of Buffer Space and Transaction Control", filed on the same date as the present application, and herein incorporated by reference. However the present invention is not necessarily limited to devices which employ multiple channels.

In the preferred embodiment, the central interconnect module performs data alignment and bus width conversion as described and claimed in commonly assigned copending U.S. application Ser. No. 11/047,522, entitled "Internal Data Bus Interconnection Mechanism Utilizing Central Interconnection Module Converting Data in Different Alignment Domains", filed on the same date as the present application, and herein incorporated by reference. However the present invention is not necessarily limited to devices which employ a data alignment and bus width conversion mechanism as described.

The use of a credit loss detection mechanism as described herein enables a system to detect potentially deleterious conditions, which might not only lead to loss of data traversing a bus, but could indicate more critical problems with system hardware.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Digital Data Processing Environment

The present invention relates to the design of digital communications interfaces. In the preferred embodiments, a modular architecture is employed in the design of an integrated circuit chip, whereby a central interconnect module within a chip facilitates data transfer among multiple functional component modules of the chip. Using this architecture, it is possible to design a family of different application specific integrated circuits (ASICs) performing diverse functions, all of which employ a similar central interconnect module design for facilitating internal data transfer. In the exemplary embodiments of the invention described herein, an ASIC performs the function of an I/O bridge interface between different buses of a general-purpose computer system. However, this is but one of many possible implementations and digital data environments in which the present invention might be employed.

Figure 1:
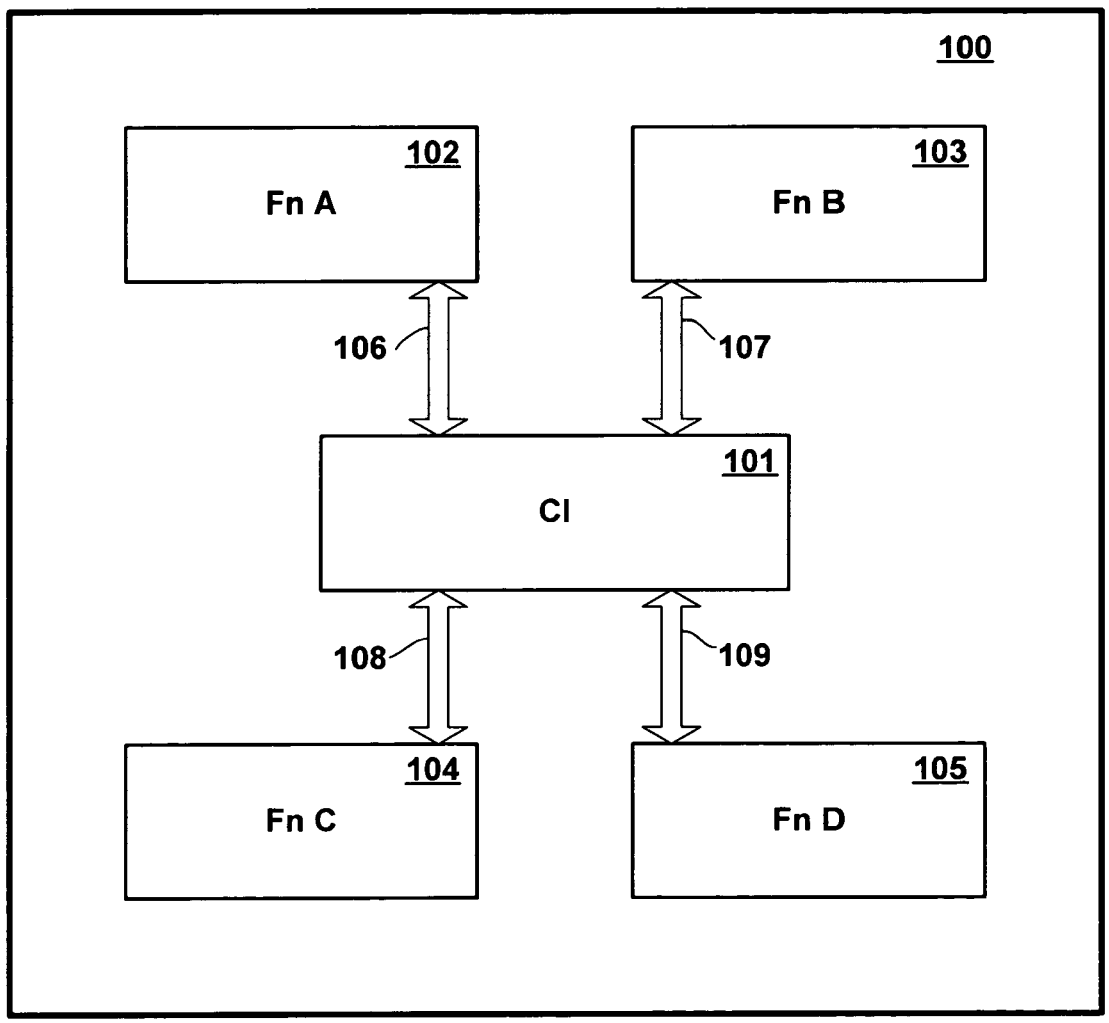
FIG. 1 is a high-level block diagram of an integrated circuit chip for embodying one or more aspects of the present invention, according to the preferred embodiments thereof.

Referring to the Drawing, wherein like numbers denote like parts throughout the several views, FIG. 1 is a high level block diagram of an integrated circuit chip 100 for embodying one or more aspects of the present invention, according to the preferred embodiments. Chip 100 comprises central interconnect (CI) module 101, and multiple functional component modules 102–105, of which four are illustrated in FIG. 1, it being understood that this number could vary. Each functional component module has its own point-to-point interconnection path 106–109, herein referred to as the ASIC Interconnect Bus (AI bus or AIB), running between the functional component module and the central interconnect module. Each AI bus preferably supports two-way data communication and physically comprises a pair of unidirectional links, as explained in greater detail herein.

Each functional component module 102–105 performs some defined logic function which is part of the operation of chip 100. The logic function performed by each functional component module could be different, or some of the functional component modules could perform essentially the same logic function. In general, data communication between one functional component module and another runs from the functional module across its AI bus to the CI module, and from there to the other functional module across that functional module's AI bus. The CI module may support a path connecting between every possible pair of functional modules, or may support only selective paths.

Although chip 100 and various embodiments described are herein referred to as ASICs for ease of understanding, the term "application specific integrated circuit" is not intended as a limitation on the functions performed by an integrated circuit chip or its components in accordance with the present invention. Furthermore, the present invention might be applied to integrated circuits which are programmable to perform different functions, or to processor chips which execute instructions embodying programs.

Figure 2:
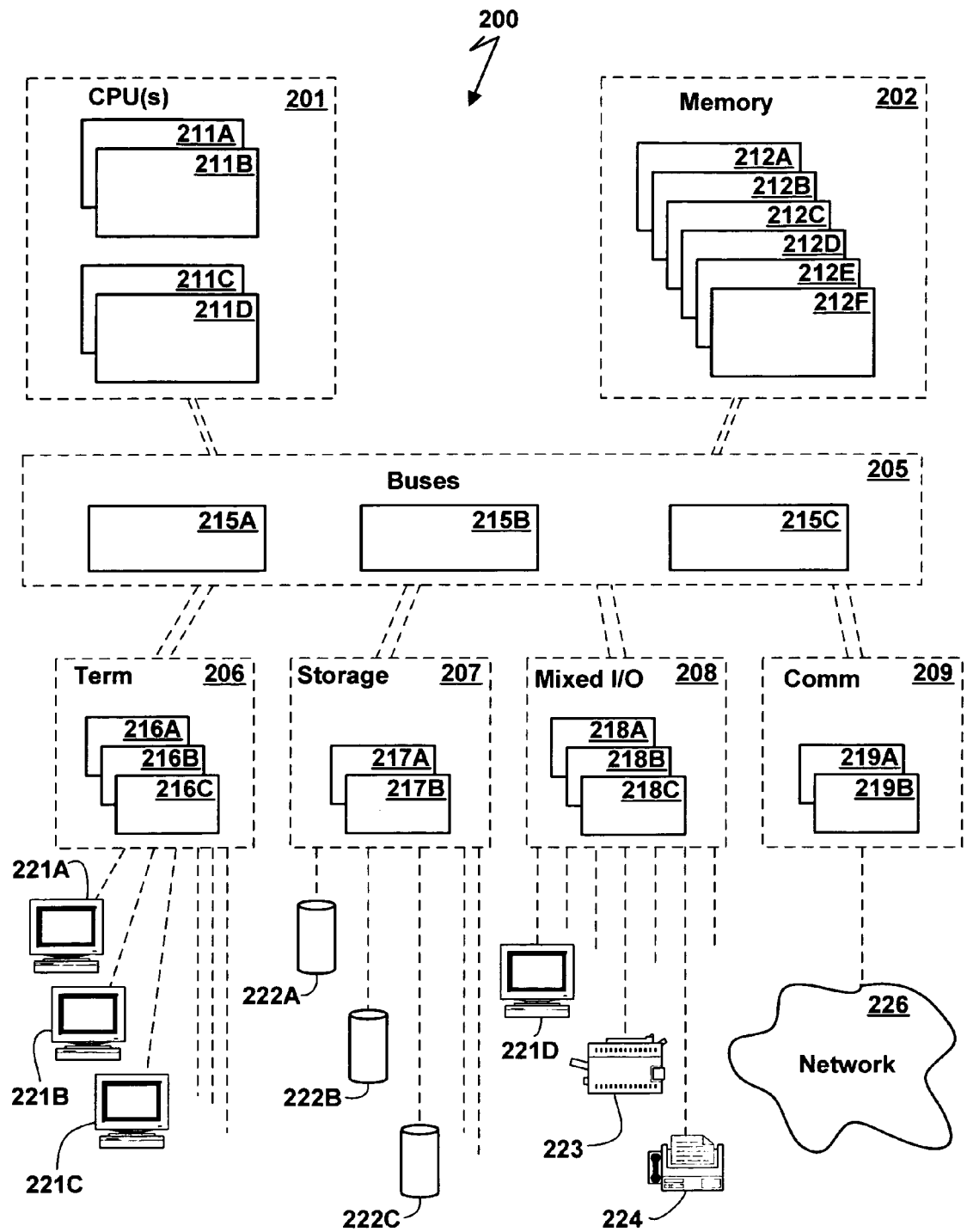
FIG. 2 is a high-level representation of the major hardware components of a computer system utilizing one or more integrated circuit chips each having a central interconnect module and shared buffer, according to the preferred embodiment.

In the preferred embodiment, one or more integrated circuit chips embodying the present invention are used in a general-purpose digital computer system. More specifically, one or more integrated circuit chips embodying the present invention are used as bus bridge chips in a general-purpose digital computer system. FIG. 2 is a high-level representation of the major hardware components of a computer system 200 for utilizing one or more integrated circuit chips each having a central interconnect module and shared buffer for communicating among multiple functional components, according to the preferred embodiment of the present invention. At a functional level, the major components of system 200 are shown in FIG. 2 outlined in dashed lines; these components include one or more central processing units (CPU) 201, main memory 202, interfaces for I/O devices such as terminal interface 206, storage interface 207, mixed I/O device interface 208, and communications/network interface 209, all of which are coupled for inter-component communication via one or more buses 205.

CPU 201 is one or more general-purpose programmable processors, executing instructions stored in memory 202; system 200 may contain either a single CPU or multiple CPUs, either alternative being collectively represented by feature CPU 201 in FIG. 1, and may include one or more levels of on-board cache (not shown). Memory 202 is a random-access semiconductor memory for storing data and programs. Memory 202 is conceptually a single monolithic entity, it being understood that memory is often arranged in a hierarchy of caches and other memory devices. Additionally, memory 202 may be divided into portions associated with particular CPUs or sets of CPUs and particular buses, as in any of various so-called non-uniform memory access (NUMA) computer system architectures.

Terminal interface 206 provides a connection for the attachment of one or more user terminals 221A–C (referred to generally as 221), and may be implemented in a variety of ways. Many large server computer systems (mainframes) support the direct attachment of multiple terminals through terminal interface I/O processors, usually on one or more electronic circuit cards. Alternatively, interface 206 may provide a connection to a local area network to which terminals 221 are attached. Various other alternatives are possible. Data storage interface 207 provides an interface to one or more data storage devices 222A–C, (referred to generally as 222), which are typically rotating magnetic hard disk drive units, although other types of data storage device could be used. Mixed I/O device interface 208 provides an interface to these or any of various other input/output devices or devices of other types. Three such devices, terminal 221D, printer 223 and fax machine 224, are shown in the exemplary embodiment of FIG. 2, it being understood that many other such devices may exist, which may be of differing types. Communications interface 209 provides one or more communications paths from system 200 to other digital devices and computer systems; such paths may include, e.g., one or more networks 226 such as the Internet, local area networks, or other networks, or may include remote device communication lines, wireless connections, and so forth. The communications paths running between I/O device interfaces 206–209 and the devices or networks may be dedicated communication links or links which are shared (e.g., multi-drop buses), and may be generally referred to as I/O buses, whether single or multiple devices are attached thereto.

Buses 205 provide communication paths among the various system components. Although a single conceptual bus entity 205 is represented in FIG. 2, it will be understood that a typical computer system may have multiple buses, often arranged in a complex topology, such as point-to-point links in hierarchical, star or web configurations, multiple hierarchical busses, parallel and redundant paths, etc., and that separate buses may exist for communicating certain information, such as addresses or status information.

Physically, the major functional units are typically embodied in one or more integrated circuit chips. Such chips are generally mounted on electronic circuit card assemblies, with multiple chips often mounted on a single circuit card. In FIG. 2, CPU 201 is represented as containing four integrated circuit chips 211A–D, each of which may contain one or more processors, or may perform only part of the functions of a single processor; memory 202 is represented as containing six chips 212A–212F, buses 205 as containing three chips 215A–C, terminal interface 206 as containing three chips 216A–216C, storage interface 207 as containing two chips 217A–B, I/O and mixed I/O device interface 208 as containing three chips 218A–C, and communications interface 209 as containing two chips 219A–B. However, the actual number of such chips may vary.

It should be understood that FIG. 2 is intended to depict the representative major components of an exemplary system 200 at a high level, that individual components may have greater complexity than represented FIG. 2, and that the number, type and configuration of such functional units and physical units may vary considerably. It will further be understood that not all components shown in FIG. 2 may be present in a particular computer system, and that other components in addition to those shown may be present. Although system 200 is depicted as a multiple user system having multiple terminals, system 200 could alternatively be a single-user system, typically containing only a single user display and keyboard input, or might be a server or similar device which has little or no direct user interface, but receives requests from other computer systems (clients).

Figure 3:
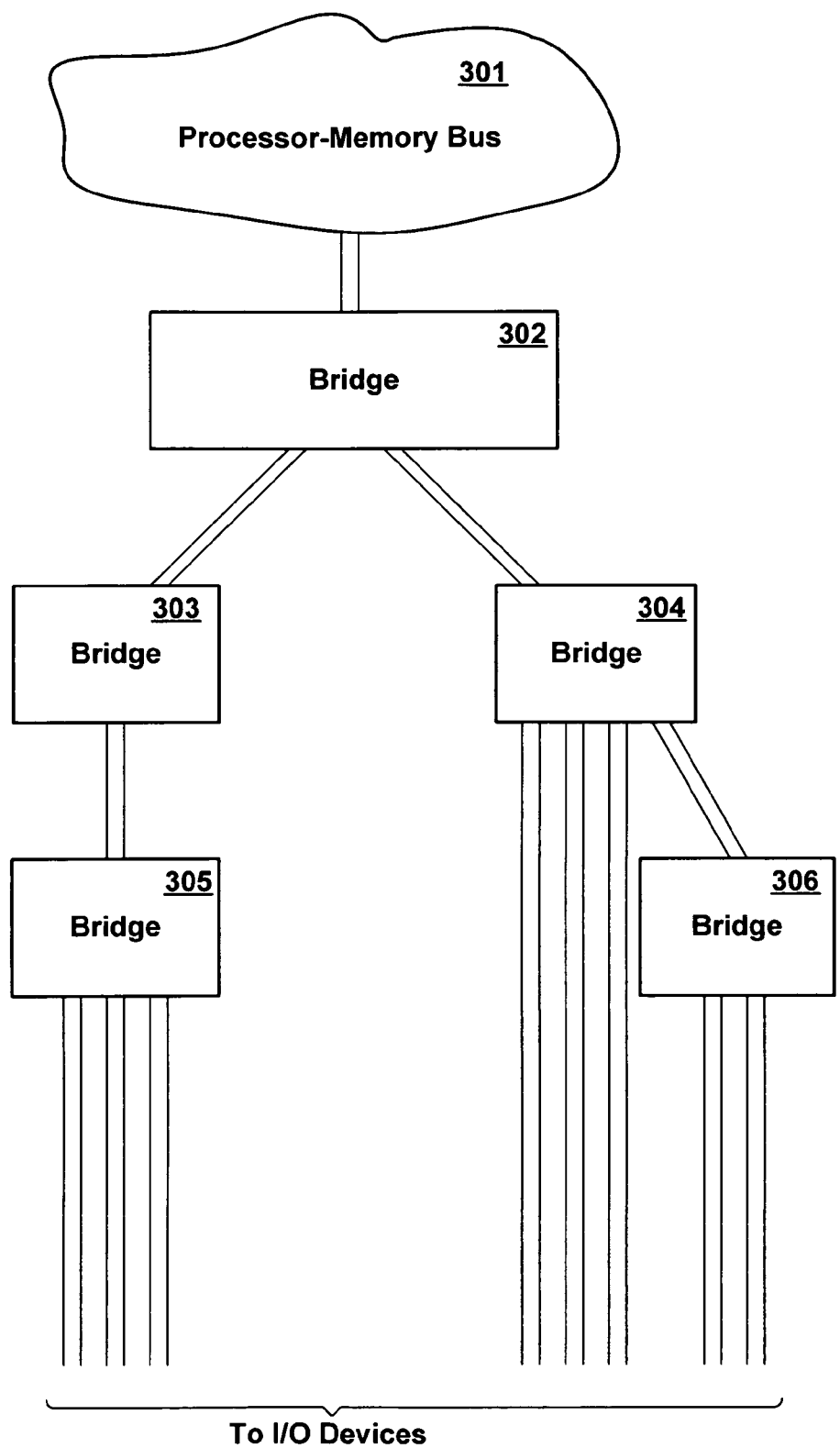
FIG. 3 is a generalized representation showing in greater detail a hierarchy of I/O device communication paths within a computer system, according to the preferred embodiment.

Communication paths which connect the various components of system 200, and in particular paths connecting any of the various I/O devices with CPUs 201 or memory 202, are represented in FIG. 2 at a high level of abstraction. In fact, such paths are typically far more complex, and are generally arranged in a hierarchy. FIG. 3 is a generalized representation showing in greater detail a hierarchy of I/O device communication paths within system 200.

Referring to FIG. 3, at the top of the hierarchy are those paths coupling the CPUs to main memory, sometimes referred to as the processor-memory bus, which must operate at a high bandwidth. The processor-memory bus is represented in FIG. 3 in simplified conceptual form as feature 301. Although referred to as a "bus", in all but the smallest systems it is typically a collection of communication links connecting the various CPUs, memory controllers and memory modules. These links may include repeaters or interconnection modules which provide fan-in and fan-out of communications paths. In order to support multiple CPU and memory destinations, the processor-memory bus is itself often hierarchical, as in the case of so-called NUMA architectures.

Processor-memory bus 301 will connect to at least one, and possibly multiple, high level I/O bus bridges 302, of which one is represented in FIG. 3. Each high level I/O bus bridge drives one or more I/O buses, which may in turn be coupled to lower level I/O bridges 303–306 (which may also be called I/O adapters or I/O controllers), each of which may in turn be coupled to one or more additional buses. At each bridge, the coupled buses may use the same or different protocols. Thus the number and variety of attached I/O buses tends to increase progressively down the hierarchy.

For consistency of descriptive terminology herein, bus communications traveling in a direction from the processor-memory bus 301 toward the I/O devices are referred to as "outbound" communications or data, while communications traveling from the I/O devices toward the processor-memory bus are referred to as "inbound" communications or data. Similarly, the data bus or buses on the processor-memory bus side of a particular reference point (such as an I/O bridge) of a path running from the processor-memory bus to the I/O devices are referred to as the "inbound" bus or buses, while the data bus or buses on the I/O device side of the reference point are referred to as "outbound" buses.

In a large computer system such as represented in FIGS. 2 and 3, it may be desirable to support a variety of different I/O devices, coupled to a variety of different I/O buses, each of which may employ a different protocol. Each of these I/O devices should ultimately communicate with the processor-memory bus 301. To simplify design, it is desirable to use a common architecture for all I/O bridge devices, using different I/O bus protocols as required. Preferably, a family of different I/O bridge chips is available for configuration in computer system 200, each respective I/O bridge chip being an ASIC which supports communication between one inbound I/O bus (or, in some cases, multiple inbound buses) on the one hand, and one or more outbound I/O buses on the other hand. Each ASIC of the family of I/O bridge unit ASICs supports a different set of I/O bus types, which could be one or more buses of a single type or a mixed set of I/O buses.

I/O Bridge Unit Overview

Figure 4:
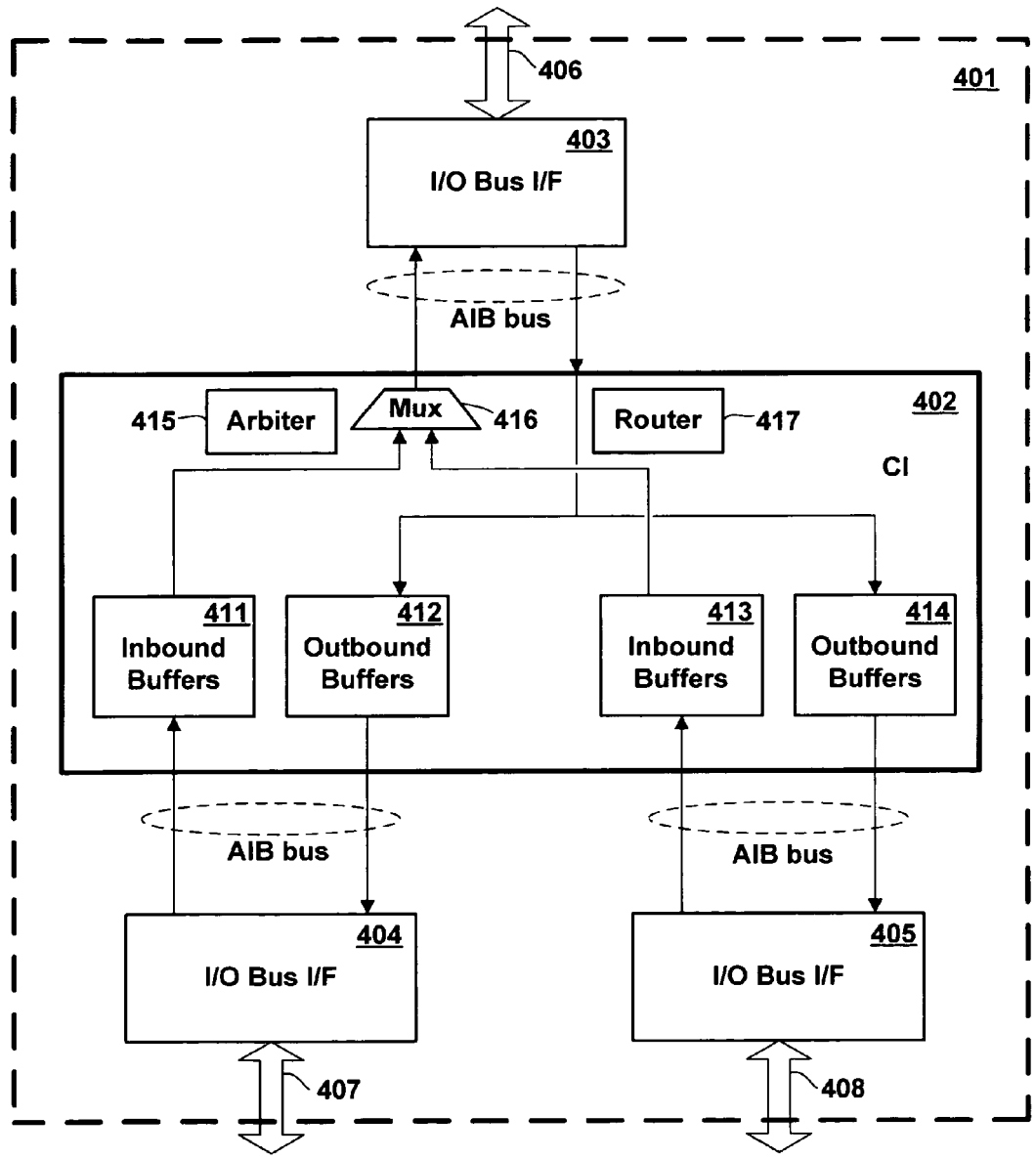
FIG. 4 is a block diagram showing in greater detail the major components of an exemplary I/O bridge unit embodying one or more aspects of the present invention, according to the preferred embodiment.

In accordance with the preferred embodiment, each ASIC of the family of I/O bridge unit ASICs uses a common architecture consistent with the architecture of FIG. 1. FIG. 4 is a block diagram showing in greater detail the major components of an exemplary I/O bridge unit 401, according to the preferred embodiment. Bridge unit 401 could be any of high level bridge unit 302 or lower level bridges 303–306.

Referring to FIG. 4, bridge unit 401 comprises a single central interconnect module 402, one or more inbound I/O bus interface component modules 403, of which one is shown in FIG. 4, and one or more outbound I/O bus interface component modules 404, 405, of which two are illustrated in FIG. 4. Central interconnect module 402 and interface component modules 403–405 are specific implementations of the architectural central interconnect module 101 and functional component modules 102–105, respectively, of FIG. 1.

Inbound I/O bus interface component module 403 contains logic circuitry necessary for interfacing with inbound I/O bus 406, i.e., module 403 contains registers, drivers, receivers and control circuitry for sending and receiving data on inbound I/O bus 406, according to some pre-defined protocol for that bus. Outbound I/O bus interface component modules 404, 405 similarly contain logic circuitry necessary for interfacing with respective outbound I/O buses 407–408. Each interface component module 403–405 is coupled to central interconnect module 402 via a respective AI bus.

Central interconnect module 402 supports communications within bridge unit 401 (i.e., internal to a single integrated circuit chip). In this embodiment, CI module 402 supports an N-to-1 inbound data path and a 1-to-N outbound data path. I.e., inbound bus traffic from multiple I/O bus interface components 404,405 is routed through CI module 402 to a single inbound I/O bus interface component 403, and from there toward the processor-memory bus via inbound I/O bus 406. Outbound bus traffic from the inbound I/O interface component 403 is routed through CI module 402 to multiple I/O bus interface components 404, 405 (each outbound packet generally being routed to only a single respective one of the multiple I/O bus interface components). CI module 402 does not support a path between any arbitrary component pair. For example, CI module 402 does not provide a direct communication path between outbound I/O bus interface component 404 and outbound I/O bus interface component 405. The only way for I/O devices on different I/O buses to communicate with each other would be to go through some other system component attached to the processor-memory bus.

For each path running between a pair of components which is supported by CI module 402, the CI module contains a respective inbound buffer 411, 413 and outbound buffer 412, 414. Inbound buffers 411, 413 feed multiplexer 416 under control of arbiter 415. Outbound data arriving in CI module is routed by router 417 to an appropriate outbound buffer 412, 414. As explained in greater detail herein, in the preferred embodiment buffering for I/O bridge unit 401 is performed primarily in buffers 411–414 within the CI module. I.e., little or no buffering capability exists in I/O bus interface component modules 403–405.

The AI bus architecture specifies a common bus design and protocol for all internal data buses in I/O bridge unit 401. Each AI bus is a pair of unidirectional point-to-point parallel data links, the two links of a pair carrying data in opposite directions. The AI bus architecture supports buses of varying data width (8, 16 or 32 byte). It is not necessary that all AI buses connecting to the CI module 402 within a single I/O bridge unit be of the same width. On the contrary, it is normally expected that the width of each AI bus will match the bandwidth of the I/O bus 406–408 corresponding to the I/O bus interface component 403–405 to which the AI bus is attached. By matching the AI bus width to the corresponding I/O bus bandwidth, the buffering and logic required in the I/O bus interface component is reduced.

The AI bus architecture supports data transfers which are buffered at only one of the sending or receiving device. It uses a credit-based scheme, described in greater detail herein, to allow a sender to control a transfer. I.e., a sending device can send data to a buffer in the receiving device, or can send data from its buffer to an unbuffered receiving device, as long as the sender has available credits. As long as the sender has available credits, the receiver must accept such data. This type of transfer is referred to herein as a "Push" type transfer. Commands are always transferred using a Push. Data may be transferred using a Push, or an optional "Pull" type transfer. In a Pull type transfer, after the corresponding command has been Push transferred to a receiver, the receiver accesses and releases a buffer in the sender.

Using the AI bus architecture, it would be possible to place data buffers in each of the functional components, and avoid buffering in the CI module. It is alternatively possible to place data buffers in the CI module, which are shared by the component modules (as shown in the exemplary I/O bridge unit of FIG. 4), thus avoiding buffering in the component modules. In the case of an I/O bridge unit, the latter approach has the advantage of reducing the number of buffers required and the number of buffers which must be traversed by each data packet passing through the unit. However, there may be applications in which separate buffers in the functional components are preferred, e.g., where functional components need to maintain their own buffers to perform some desired function.

CI module preferably performs any required alignment of data and conversion to the proper bus width. In general, it is assumed that data alignment requirements are more stringent (occur on larger boundaries) and bus widths are wider as the buses are closer to processor-memory bus 301. Therefore, it may be necessary to align inbound data to adjust to a larger data alignment boundary on the inbound I/O bus 406 than on a outbound bus 407, 408, but will not be necessary to align outbound data because data which is already aligned on a larger boundary is necessarily aligned on a smaller boundary, the boundaries conventionally being powers of two. Appropriate data alignment logic is coupled to respective inbound buffers 411, 413, for aligning incoming data. The operation of this data alignment logic is described in greater detail herein. Where necessary, bus width adjustment is also performed in conjunction with buffers 411–414, as described in greater detail herein.

It will be understood that FIG. 4 is a simplified representation of certain major components of an I/O bridge unit according to the preferred embodiment, and that certain features not essential to an understanding of the present invention have been omitted for clarity. In particular, the I/O bridge unit may contain additional internal data paths for initial program loads, diagnostics and error recovery, state monitoring, and so forth.

Buffer Operation

In accordance with the preferred embodiment, a construct called a "channel" is used to govern the use of buffer space and selection of transactions for transmission. A channel is an abstract subdivision of the data capacity of a path within the I/O bridge unit. AI bus traffic is in the form of discrete packets of data, each packet being assigned to a respective channel. A packet is allowed to use only the resources, and particularly the buffer resources and credits, of the channel to which it is assigned.

Figure 5:
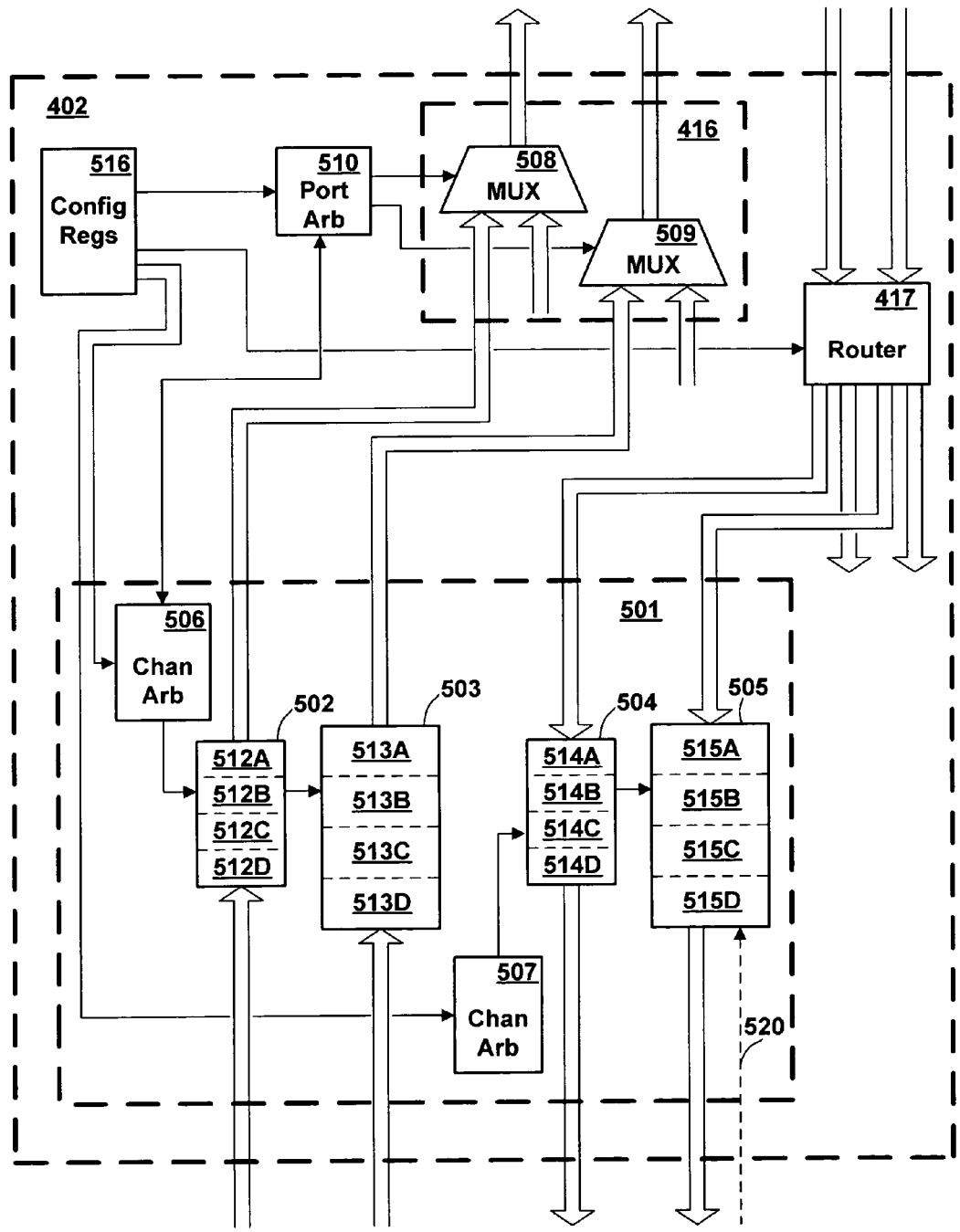
FIG. 5 is a simplified representation of the major components of the buffers and associated data paths within a central interconnect module of an I/O bridge unit, according to the preferred embodiment.

FIG. 5 is a simplified representation of the major components of the buffers and associated data paths within CI module 402, according to the preferred embodiment. For clarity of illustration, FIG. 5 shows only buffers associated with a single port 501 coupled to an outbound I/O bus interface component via a corresponding AI bus. However, it will be understood that CI module 402 may contain multiple ports (each designated feature 501) coupled to an outbound I/O bus interface via a respective AI bus. As shown in FIG. 5, each such port 501 contains an inbound command buffer 502, an inbound data buffer 503, an outbound command buffer 504, and outbound data buffer 505, an inbound channel arbiter 506, and an outbound channel arbiter 507.

CI module 402 additionally includes a single port coupled to the inbound I/O bus interface component 403 via an AI bus, herein designated "Port 0". Port 0 contains no buffers of its own, the CI module's buffering being accomplished in the ports 501 which are coupled to outbound I/O bus interface components. The major components of port 0 include multiplexer 416 (which is actually implemented as a pair of multiplexers 508, 509, corresponding to the command bus and data bus, respectively); router 417 (which is actually implemented as separate portions corresponding to the command bus and the data bus); and port arbiter 510.

Configuration register 516 provides configuration information to router 417, port arbiter 510, and the channel arbiters 506, 507 in each respective port 501. Configuration register is represented in FIG. 5 as a single entity, although in fact it may be implemented as multiple configuration registers each associated with a respective port. Among other things, configuration register contains programmable information for determining buffer allocations, routing and arbitration selection for data transactions.

In accordance with the preferred embodiment of the present invention, a flexible and programmable flow control scheme is used which permits independent flow control for each channel. This flexible, programmable scheme facilitates performance tuning of a computer system by allowing a systems administrator or equivalent person to assign different types of transactions to different channels, to vary the buffer space allocated to different channels, and to specify different priorities and arbitration functions for different channels.

Buffer space in each buffer is allocated among multiple channels, each channel being allocated a respective discrete portion of buffer space. As shown in FIG. 5, space in inbound command buffer 502 is divided into four discrete channel buffer space portions 512A, 512B, 512C and 512D corresponding to four respective channels; space in inbound data buffer is similarly divided into discrete channel buffer space portions 513A, 513B, 513C and 513D; space in outbound command buffer is divided into discrete channel buffer space portions 514A, 514B, 514C and 514D, and space in outbound data buffer is divided into discrete channel buffer space portions 515A, 515B, 515C and 515D.

The AI bus architecture supports either four or eight channels for each data path through the CI module, i.e., either a 2 or 3-bit channel select for each such path. Since all traffic passing through CI module 402 shares a single Port 0, the number of channel select bits (either 2 or 3) is the same for all data paths through the CI module. However, the size of the buffer space portions 512A–D, 513A–D, 514A–D 515A–D allocable to each respective channel is individually programmable for each data path, each buffer, and each channel. This size can be set to zero, so is it effectively possible to use any number of channels up to eight, and to use different numbers of channels for different data paths. For example, if a first data path uses six channels and a second data path uses only three channels, a 3-bit channel select is required for all data paths, but in the case of the first data path, two of the channels are allocated zero buffer space, and in the case of the second data path, five of the channels are allocated zero buffer space. The sizes of the command buffer space portions 512A–D, 514A–D are programmable independently of the sizes of the corresponding data buffer space portions 513A–D, 515A–D. Configuration information concerning the sizes of the buffer space portions is contained in configuration register 516.

Each buffer space portion allocated to a particular data path and channel is operated as a circular buffer, and is a strictly FIFO queue. I.e. within a given channel, the order in which packets are received is maintained, and packets are always removed from the buffer space portion in the order received. However, among different buffer space portions within the same buffer, i.e among different channels in the same data path, this ordering is not necessarily maintained. A sequence number is assigned to a packet when it arrives in the buffer. Among packets traversing the same data path through the CI module, it is possible for a later arriving data packet to be transmitted onward before an earlier arriving data packet, if the packets are assigned to different channels.

Figure 6:
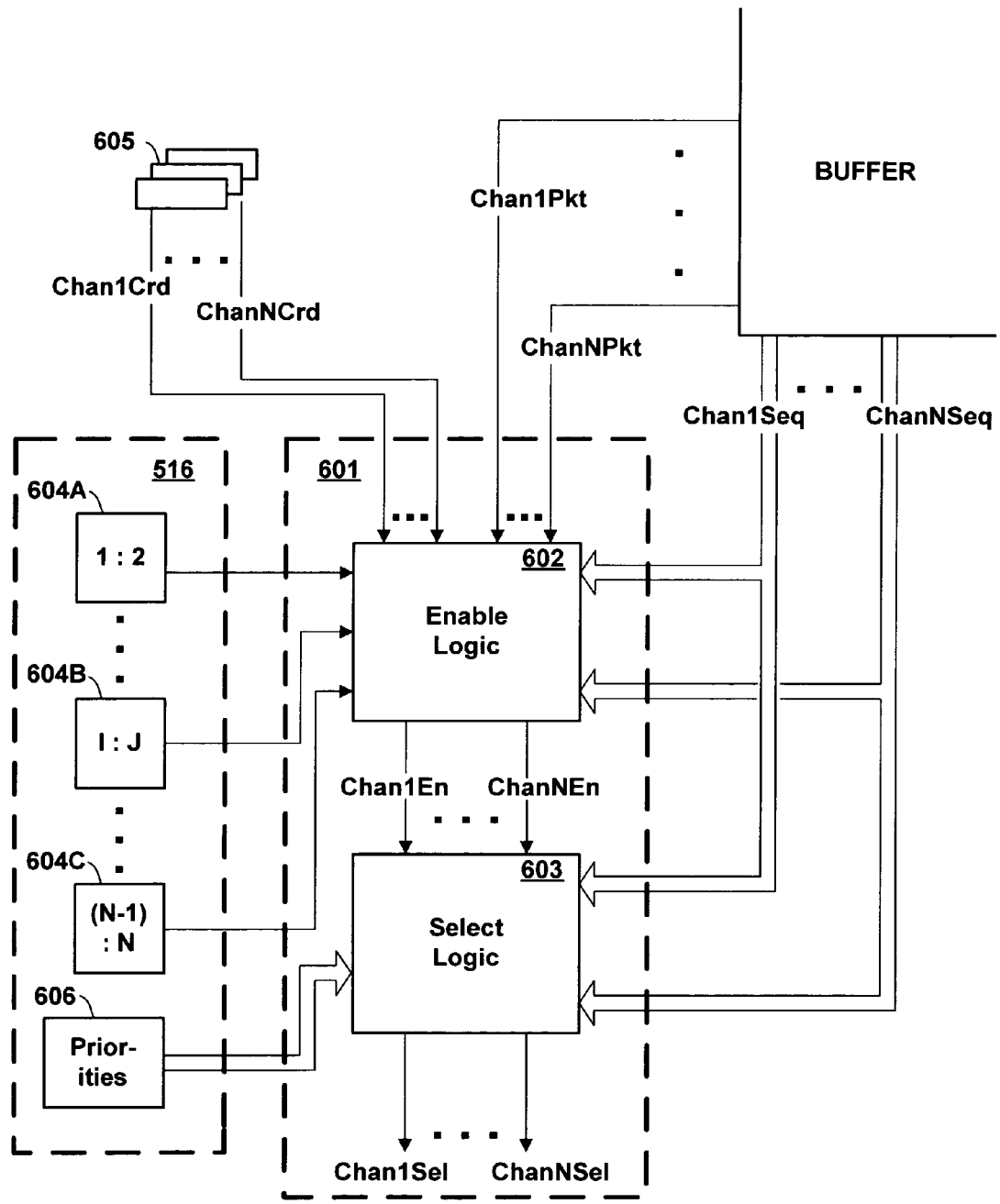
FIG. 6 is a generalized representation of a channel arbiter for a chip internal bus, according to the preferred embodiment.

The function of channel arbiters 506, 507 is to select a channel for transmission of the next data packet from the corresponding buffer. Because a FIFO ordering is strictly m maintained within each channel, the selection of a channel effectively selects the next data packet (i.e., the data packet which arrived first in that channel). FIG. 6 is a generalized representation of a channel arbiter 601 for an AI bus, according to the preferred embodiment. Channel arbiter 601 contains channel enable logic 602 for generating one or more channel enable signals (ChanIEn), each corresponding to a respective channel, and channel select logic 603 for activating one of a plurality of channel select lines (ChanISel), each corresponding to a respective channel.

In the preferred embodiment, the arbitration scheme is independently programmable for each channel arbiter. I.e., not only is it possible to program a different arbitration scheme for each port 501, but also a different arbitration scheme for each outbound or inbound path within a port. However, the command buffer and corresponding data buffer for a particular path must follow the same arbitration scheme. Command buffer 502 and corresponding data buffer 503 follow the same arbitration scheme, and command buffer 504 and corresponding data buffer 505 follow the same arbitration scheme; the arbitration scheme for buffers 502 and 504 is not necessarily the same.

For each port and path direction, configuration register 516 specifies an applicable arbitration rule for each ordered pair of channels. For example, for port 501 and the inbound path direction (stored in buffers 502 and 503), four channels are represented, herein designated channels A, B, C and D. The configuration register specifies an applicable arbitration rule for each of the twelve ordered pairs: (A,B), (A,C), (A,D), (B,A), (B,C), (B,D), (C,A), (C,B), (C,D), (D,A), (D,B), and (D,C). As represented in FIG. 6, configuration register portions 604A–C corresponding to respective ordered pairs store the applicable rule for each ordered pair. The arbitration rule specifies an arbitration action between two channels when the first channel of the ordered pair is prior in time, i.e., the oldest packet in the first channel's buffer portion arrived earlier than the oldest packet in the second channel's buffer portion. For each ordered pair, one of the following three arbitration rules is specified:

Rule 1: No passing is permitted, i.e., the packet from the first channel must in all cases be selected before the packet from second channel.

Rule 2: Passing is permitted only if the first channel is stalled, i.e., the packet from the second channel may be selected before the packet from the first channel only if the packet from the first channel can not proceed, either because the first channel lacks available credits or for some other reason.

Rule 3: Passing is permitted, i.e., the packet from the second channel is always permitted to pass the packet from the first channel, provided that the second channel has not stalled.

Channel arbiter 601 essentially implements the arbitration rules in hardware, using input from the configuration register to determine the applicable rule for each ordered pair of channels. In addition to the input from configuration register 516, channel arbiter 601 receives input from sender credit counters 605 indicating whether credits are available for each channel, and input from the buffer indicating, with respect to each channel, whether a packet is available, and the sequence number of the oldest packet. Specifically, for each channel I (ChanI), an arbiter implements an enable logic function 602 for determining whether the channel is enabled to provide a packet from the buffer, the enable logic function equivalent to:

$$\text{Chan}I\_En = \text{Chan}I\_Pkt \text{ AND } \text{Chan}I\_Crd \text{ AND } \{\text{For each Chan}J: (\neg\text{Chan}J\_Pkt \text{ OR } \text{Chan}J\_Seq < \text{Chan}J\_Seq \text{ OR } \text{PassRule}I{:}J = \text{permitted})\} \quad (1)$$

where ChanI_En is an enabled signal for channel I indicating it is capable of providing a packet for transmission; ChanI_Pkt indicates there is at least one packet in the buffer for channel I; ChanI_Crd indicates there is at least one available credit in channel I for transmission of a packet; ChanI_Seq indicates the seqence number (arrival order) of the oldest packet in channel I, a lower number signifying an earlier arrival; and PassRuleI:J=permitted indicates that passing is permitted under the applicable arbitration rule above for the ordered pair I,J. It will be observed that it is possible that no channels will be enabled (logic function (1) evaluates to FALSE for all channels), even if there are channels with available packets to send, and even if at least one of those channels has available credits. For example, a first channel might be stalled for lack of credits, and the arbitration rules might be such as to prevent packets in other channels from passing the first channel.

As is explained in greater detail herein, credits are independently maintained for the command and data portions of each channel. Where a packet in the buffer contains a command-only, and does not contain any data, ChanICrd will be true if a command credit is available on the corresponding channel, regardless of the existence of any data credits. Where a packet contains both commands and data, the ChanICrd input can be derived in one of two ways. In a first implementation, ChanICrd is true only if a command credit is available and a data credit is available on the corresponding channel. In a second implementation, ChanICrd is true if a command credit is available, and the corresponding data is sent as soon thereafter as the data credit becomes available.

If only one channel is enabled, that channel is selected by the channel arbiter. If one or more channels are enabled (there is at least one channel for which the logic function (1) above evaluates to true), at most one enabled channel is selected by select logic 603. In addition to the rules, each channel is assigned a respective priority 606 (which is not necessarily unique). Select logic selects the channel having highest priority, and in the event that two or more channels have the same priority, selects the channel with the lowest sequence number.

It will be appreciated that logic optimization functions may make certain optimizations of the above equations when generating actual hardware, and that while enable logic and select logic have been shown and described separately for illustrative purposes, these functions might by combined by logic optimizations. It is up to the system administrator and/or configuration software to avoid setting the arbitration rules to contradictory values. For example, if the pair (A,B) is set to Rule 3, then the pair (B,A) should not also be set to Rule 3, or results may be unpredictable.

For outbound data, there is a physical AI bus corresponding to each channel arbiter 507 for outbound data, and so the channel arbiter effectively selects the next packet for transmission on that bus. In the case of inbound data, the Port 0

AI bus is shared by multiple ports 501 and their associated buffers. Therefore port arbiter 510 works in conjunction with channel arbiter 506 to select the next data packet for transmission from port 0. Channel arbiter 506 determines whether there is at least one enabled channel (as explained above), and signals port arbiter if at least one channel is enabled for sending a data packet. Port arbiter selects a port (from among those having an enabled channel) for transmitting the next data packet. This selection is output to multiplexers 508, 509, which select an input from one of ports 501, and to the corresponding channel arbiter 506.

Port arbiter 510 can be programmed to implement any of several conventional arbitration schemes. Specifically, port arbiter can be programmed to implement a round-robin arbitration, a fixed priority arbitration, or a weighted round-robin in which certain channels receive greater bandwidth than others. The arbitration scheme to be implemented by port arbiter 510 is stored in configuration register 516.

Router 417 determines a destination port (from among ports 501) and channel for packets received on port 0 and routes the packets accordingly. The AI bus architecture supports two alternative forms of routing determination. Although the architecture supports two forms, only one is chosen for implementation in any specific bus path, the form chosen then being fixed in the hardware. In accordance with the AI bus architecture, a 4-bit field within the command is designated a port ID, and a 3-bit field within the command a channel ID. In a first form of routing determination, the sender (in this case, inbound I/O bus interface component 403) transmits the port ID and channel ID in the applicable fields of the command, and the router simply routes the packet to the specified port and channel. The sender therefore must determine the applicable port ID and channel ID. In the case of an I/O bus interface, this information might be received remotely over the corresponding I/O bus.

In a second form of routing determination, the sender specifies only a channel ID, and the router determines a port from the destination address and command type. When using this form of routing determination, router 417 contains a programmable mask register, a set of comparators, and a set of programmable compared value registers, each corresponding to a respective port. The mask register masks selective bits of the command type and address from the command, and the unmasked bits are compared to values in the compared value registers to select a destination port.

In the preferred embodiment, there are two forms of Push protocol defined in the architecture, herein referred to as a base Push and an extended Push. The extended Push allows greater flexibility in the sequence of data transfer. Specifically, the extended Push allows the sender to send data ahead of the command, and in an optional implementation, allows data portions within a packet to be sent out of order. These capabilities can be useful in certain circumstances. For example, if the command buffer portion of the applicable channel is full but the data buffer portion is not, transfer of the data portion only may be initiated, the command being transferred as soon thereafter as a command credit becomes available. Additionally, in certain external I/O bus protocols, data portions may be received out of order. Since, in the preferred embodiment, the I/O bus interface component does not have a buffer of its own, using the shared buffer of the CI module instead, it must be able to transmit received data immediately to the CI module. The optional implementation of an extended Push protocol permits data portions arriving out of order from an external bus to be transmitted immediately to the CI module's shared buffer. In order to support this increased flexibility in the extended Push protocol, the data bus contains additional fields for a destination port ID, a channel ID, and optionally, a push data offset indicating an offset of the data from the starting address of the transaction. When using the extended Push, the router will route data according to the values in these additional fields.

In the preferred embodiment, a third protocol (a Pull protocol) is defined for the AI bus. The Pull protocol is never used in port 0, nor in the inbound path to one of ports 501. It is implemented (optionally) in the outbound path from a port 501, as indicated by dashed line 520. The Pull protocol allows an outbound I/O bus interface component 404, 405 to exercise some control over outbound data buffer 505, and in particular to release space in data buffer 505. Using the Pull protocol, an outbound I/O bus interface component can re-read data from buffer 505 multiple times, releasing the buffer space only after it has determined that it is finished. The use of the Pull protocol is described in greater detail herein.

I/O bridge chip 401 may need to operate in different clock domains to accommodate clock signals on different I/O buses. In the preferred embodiment, each I/O bus interface component is free to operate on a clock domain consistent with the bus to which it is attached, and the corresponding AI bus connecting the I/O bus interface to CI module 402 operates on the same clock domain. CI module 402 is capable of operating in multiple clock domains, the clock domains dividing at the buffers. I.e., commands and data are entered in the buffers in the clock domain of the sending component from which the CI module received them, and are removed from the buffers in the clock domain of the receiving component to which the CI module will send them. Various components within the CI module operate accordingly. For example, router 417, port arbiter 510, multiplexers 508, 509 and channel arbiter 506 operate in the clock domain of the port 0 interface, i.e. the clock domain of I/O bus interface component 403. Channel arbiters 507 each operate in the clock domain of the I/O bus interface component to which they correspond.

Credit Accounting and Credit Loss Detection

As explained previously, in the preferred embodiment, a credit-based scheme is used to regulate the sending of commands and data by a sender in a Push-type transaction. The use of credits enables the sender to know when the receiver is ready to accept data, without first polling the receiver or performing some other bus operation to verify that the receiver can accept data. This capability is of particular significance when one of the components has little or no buffering capability of its own. For example, in the preferred embodiment, inbound I/O bus interface component 403 has little or no buffering capability. Therefore it must not accept incoming packets over the inbound I/O bus 406 if it is unable to immediately transmit these packets to available buffers in CI module 402. Inbound I/O bus interface component 403 can refer to its credit counters to know whether it is able to immediately transmit the packets to CI module 402, without the need for polling CI module 402. If credits are not available, inbound I/O bus interface component 403 will prevent an upstream component from transmitting over bus 406, according to the protocol applicable to bus 406, until credits become available.

The same credit-based scheme is used for transferring data in either direction of each AI bus. Thus, CI module 402 can not transmit from a buffer to inbound I/O bus interface component 403 unless there is an available credit. Since I/O bus interface 403 has little or no buffering, it must be able to immediately transmit any packets received from CI module 402 over inbound I/O bus 406. The protocol for I/O bus 406 will determine whether I/O bus interface 403 can transmit immediately, and whether there should be available credit. Such a protocol could itself be a credit-based scheme, wherein interface module knows whether it can transmit based on the available credits from an upstream device. However, the I/O bus protocol need not be credit-based. For example, according to some protocols, I/O bus interface 403 might issue a request to transmit on bus 406, and upon granting the request, provide credit to CI module. Where such a protocol is used, I/O bus interface 403 might contain a small buffer to avoid delay when the bus grant is received.

Figure 7:
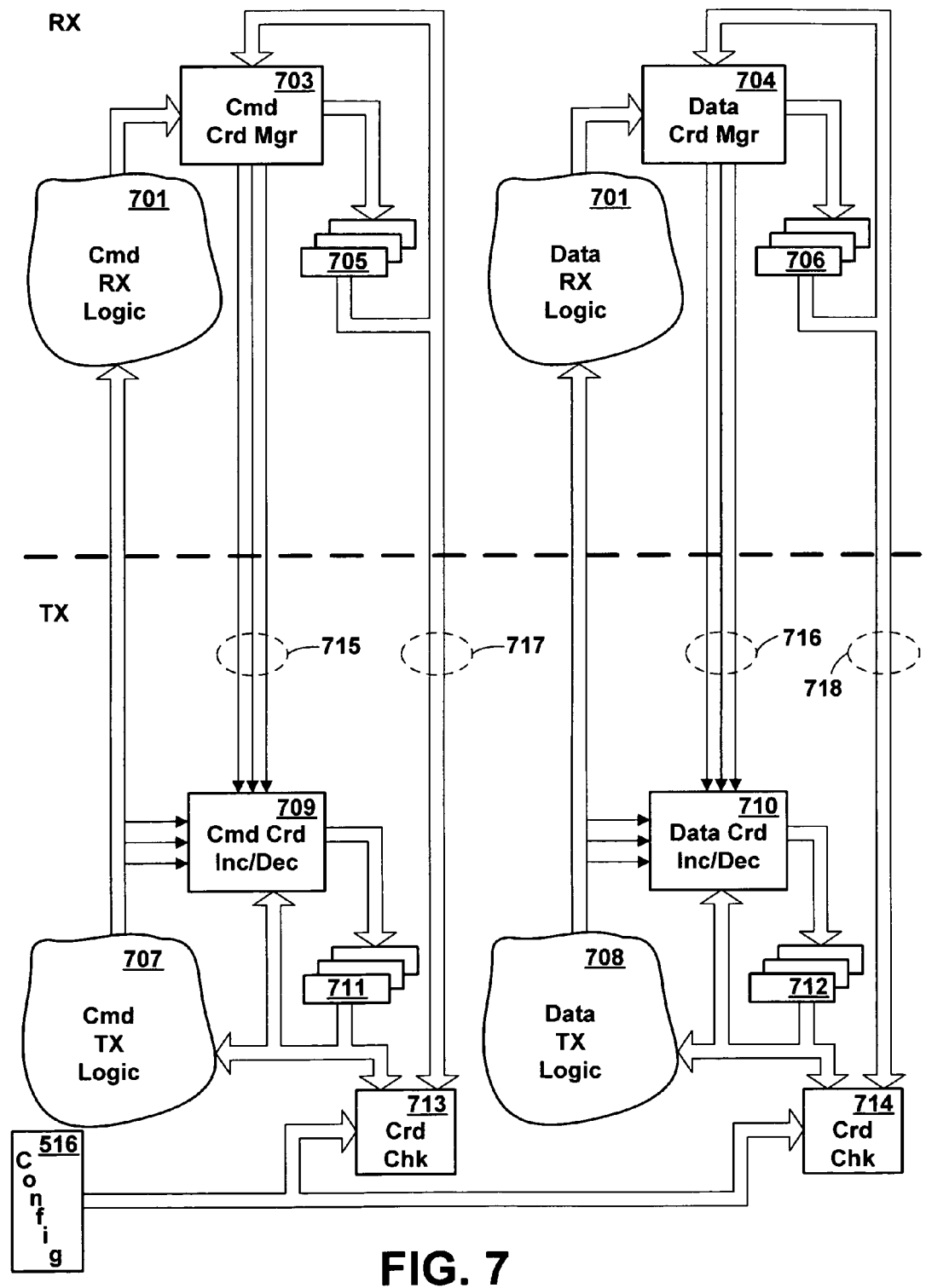
FIG. 7 is a representation of the major components of a chip internal bus credit transfer and accounting system, according to the preferred embodiment.

FIG. 7 is a representation of the major components of an AI bus credit transfer and accounting system, according to the preferred embodiment. FIG. 7 depicts the credit transfer and accounting components for a uni-directional half of an AI bus. As shown in FIG. 7, some of the components reside in the sender ("Tx") and some of the components reside in the receiver ("Rx"), the dashed line in FIG. 7 indicating a boundary between sender and receiver. A full AI bus contains separate data and command paths running in opposite directions. The components represented in FIG. 7 are duplicated for the other half of the AI bus running in the opposite direction, the placement of sender and receiver being reversed.

Referring to FIG. 7, the receiver contains command receive logic 701, data receive logic 702, a command credit manager 703, a data credit manager 704, a set of free command credit registers 705, and a set of free data credit registers 706. The sender contains command send logic 707, data send logic 708, command credit incrementer/decrementer 709, data credit incrementer/decrementer 710, a set of sender command credit counters 711, and a set of sender data credit counters 712. The receiver further contains command credit check logic 713 and data credit check logic 714.

Command send logic 707 and data send logic 708 are abstract representations of logic components on the sender side which send a packet across the AI bus to the receiver, making any necessary selection and/or verification. Where the sender is the CI module, command send logic 707 and data send logic 708 include the applicable buffers, channel arbiters, and so forth. Where the sender is one of the I/O bus interface components, the command send logic 707 and data send logic 708 include any logic necessary to assemble, verify and/or transmit the packet, according to the defined function of the interface component. The basic architectural credit mechanism requires the sender to track the number of credits available for each channel of the interface, and to send only when credits are available on the corresponding channel. The sender's command credit counters 711 and data credit counters 712 are used by the sender to record available credits. These counters contain a respective command credit count and a respective data credit count for each channel of the interface. When a sender sends a command and/or data portion of a packet, the command credit incrementer/decrementer 709 and/or data credit incrementer/decrementer decrements the command credit counter 711 and/or data credit counter 712 of the corresponding channel.

Before sending any packet across the AI bus, command send logic 707 and/or data send logic checks the available credits in the command credit counter 711 and/or data credit counter 712 corresponding to the channel on which the packet is to be sent. Specifically, where a packet to be sent contains a command-only, and does not contain any data, the sender will check only for an available command credit on the corresponding channel, and the existence of any data credits is irrelevant. Where a packet contains both a command and data, either of two implementations may be followed by the interface. In a first implementation, the sender is allowed to send the packet containing both command and data only if a command credit is available and a data credit is available on the corresponding channel. In a second implementation, the sender is allowed to independently send command or data in certain circumstances if only one of the command or data credit is available. There are two variations of this second implementation. When using the base Push protocol, the data must never precede the command, but it is possible for the command to precede the data. Therefore, if the base protocol is used in the second implementation, the command portion of a packet can be sent on the command bus if there is a command credit is available on the corresponding channel, even if a data credit is not available. In this case, the data is sent as soon as a data credit becomes available, this second implementation operating on the assumption that the data credit will soon become available. However, depending on the environment, it may be necessary to include additional logic to assure that this will be the case. Because the data portions of packets must be transmitted in the same sequence as the command portions, if a command is transmitted without data, and the data credit does not become available, the port may be frozen, unable to transmit other packets on other channels, until a data credit on the selected channel becomes available. Where the extended Push protocol is used, the sender is additionally allowed to send a data portion of a packet if a data credit is available one the corresponding channel, even if no command credit is available.

Commands and data are received by command receive logic 701 and data receive logic 702, respectively, which are abstract representations of logic components on the receiver side which receive a packet across the AI bus from the sender. Where the receiver is the CI module, command receive logic 701 and data receive logic 702 include router 417, the applicable buffers, and so forth. Where the receiver is one of the I/O bus interface components, the command receive logic 701 and data receive logic 702 include any logic necessary to re-transmit the packet across the corresponding external bus, according to any defined protocol for that external bus.

Command receive logic 701 and data receive logic 702 are coupled to respective command credit manager 703 and data credit manager 704. While the credit managers may be considered a general part of the receive logic, they are shown separately in FIG. 7 for illustrative purposes. Credit managers 703,704 comprise logic for determining when a credit has been freed up and can be returned to the sender. For example, where the receiver is a CI module, a credit is generally freed up when the corresponding packet has been removed from the CI module's buffers and re-transmitted to another functional component across its AI bus. Where the receiver is an I/O bus interface component, the credit is generally freed up when the corresponding packet has been re-transmitted across the external I/O bus; however, this is dependent on the external I/O bus protocol, and may require credit return, acknowledgment, bus grant or some other action from an external device.

Free command credit registers 705 and free data credit registers 706 record the number of credits on each channel available to the sender to send commands or data, as the case may be, on the command or data bus portion of the AI bus. The values in registers 705, 706 can be read or set by command credit manager 703, and data credit manager 704, respectively. When a command or data is received over the AI bus, command credit manager 703 or data credit manager 704 causes the corresponding channel value in free credit register 705 or 706, as the case may be, to be decremented.

When command credit manager 703 or data credit manager 704 determines that a credit has been freed and can be returned to the sender, it transmits a one-cycle pulse on the command credit return line 715 or data credit return line 716 for the corresponding channel, there being a separate 1-bit credit command return line and 1-bit data credit return line for each channel. The credit return pulse is received by the command credit incrementer/decrementer 709 or data credit incrementer/decrementer 710, as the case may be, causing the applicable incrementer/decrementer to increment the count corresponding to the applicable channel in credit counter 711 or 712, as the case may be. At approximately the same time, command credit manager 703 or data credit manager 704 increments the free credit value for the applicable channel in free credit register 705 or 706, as the case may be.

From the standpoint of the sender, each credit represents the ability to send one data packet, up to the maximum permissible size. A command is always 128 bits wide and uses a single cycle of the AI bus clock. However, a data portion of a packet might contain any amount of data, up to an architecturally defined maximum packet size (which is 256 bytes in the preferred embodiment). Therefore, if a sender has N data credits, the receiver must be able to receive N data packets of the maximum packet size. Where a substantial amount of bus traffic consists of small data packets, this can result in underutilization of the available buffer or other capacity of a receiver to receive data. For example, if a sender having eight data credits sends eight 32-byte packets, it will use all its available data credits even though a buffer space in the receiver of only 256 bytes (equivalent to a single maximum sized packet) is consumed.

If a substantial amount of the bus traffic consists of small data packets, there are two techniques which may be used to improve the utilization of data buffer or other capacity to receive data. One approach is to restrict the maximum packet size, i.e. configure the AI bus at a smaller maximum packet size, the configuration being maintained in configuration register 516. The sender breaks up any larger packets into multiple packets, inserting a separate command for each such packet. Reducing the packet size reduces the granularity of the credit count (since each data credit represents a single packet) and results in better utilization of receiver capacity. However, this approach will increase the number of commands on the command bus, possibly requiring larger command buffers.

An alternative technique is for the data credit manager 704 to track partial credits. Using this alternative technique, free credit registers 706 contain both an integer and fractional credit value. When a data packet is received, data credit manager 706 decrements the applicable free credit register value by an amount corresponding to the actual size of the data packet, which may be a fractional credit value. If the resultant free credit value, rounded down to the nearest integer, does not change, then the data credit manager immediately returns the credit to the sender by pulsing the applicable credit return line 716. Similarly, when a data packet is re-transmitted and the associated credit or partial credit is freed, data credit manager 706 increments the free credit register by an amount corresponding to the actual size of the data packet which caused credit to be freed. A credit is then returned on the applicable credit return line 716 only if the resultant free credit value, rounded down to the nearest integer, changes.

As described above, credits are being continually updated in the various registers and counters in response to data transactions. As a result of this activity, it is possible that some discrepancy will arise in the credit accounting, which could result in data loss. Although referred to herein as a credit "loss", such a discrepancy could in fact result from one of the counters or registers recording too many credits. There are several possible discrepancies. A sender may lose a credit with respect to a receiver. A receiver may lose a credit with respect to a sender. Or both the sender and receiver could lose a credit. It is also possible for the sender and/or receiver to gain unwarranted credits.

Credit loss is sometimes observed in data buses running between remote devices, where noise, clocking discrepancies or other phenomena might cause a loss. In the embodiment described herein, because both the sender and receiver are on the same chip, there should never be a discrepancy between sender and receiver, and the existence of a discrepancy is an indication of possible hardware failure or other serious problem. On the other hand, it is possible for both the sender and receiver to lose a credit, i.e. to agree with each other, but still be missing a credit. This could occur for a variety of reasons, some of which could be less serious and could be external to the I/O bridge chip. For example, a credit could be lost due to noise on an external I/O bus connection, so that it is never returned to the I/O bridge chip.

Regardless of the cause, it is desirable to detect any discrepancies in the credit accounting so that appropriate action can be taken. Command credit check logic 713 and data credit check logic 714 detect the loss (or unwarranted gain) of a credit, either by the sender or the receiver or both. A credit discrepancy is detected by comparing values from credit counters 711, 712, values from free credit registers 705, 706, and maximum credit values from configuration register 516, as described herein. Free command credit bus 717 and free data credit bus 718 transmit the available command and data credits from free credit registers 705, 706 to credit check logic 713, 714. Preferably, each free credit bus comprises multiple sets of multi-bit parallel lines (6 bits for commands, 8 bits for data), each set corresponding to a respective channel. Where data credit manager 704 maintains a count of partial credits in its free data credit registers 706 as described above, only the integer portion of the data credits are transmitted over free data credit bus 718 and compared with corresponding values in data credit counters 712.

When detecting credit discrepancies, it must be understood that certain timing delays may exist in the physical signals as implemented in an integrated circuit chip. In particular, credit return lines 715, 716 are preferably designed for minimal delay signal transmission, because delays in these signals may slow the bus. I.e., the sender can not send until it has credits, and if the credit returns are unduly delayed, a sender may be waiting idle for a credit when it fact it has already been freed. On the other hand, the values in free credit registers 705, 706 which are transmitted over free credit buses 717, 718 do not have such critical timing requirements. As noted, a separate multi-bit parallel link exists for each channel in the interface, so the free credit buses 717, 718 could contain a large number of lines. Due to other chip design requirements, it may be desirable to route these lines along less critical chip areas, resulting in a longer propagation delay than that of the credit return lines 715, 716. Additionally, where a sender transmits a packet, it decrements its credit counter 711, 712 immediately, while the value on the free credit buses 717, 718 must first be updated at the receiver and returned on the bus. Therefore, during normal operation there will be many times during which the instantaneous values read from counters 711, 712 do not match the corresponding instantaneous values on free credit buses 717, 718 due to different delay times in updating the values. Among other things, any technique for detecting credit discrepancies must account for these difference in delay times.

Figure 8A:
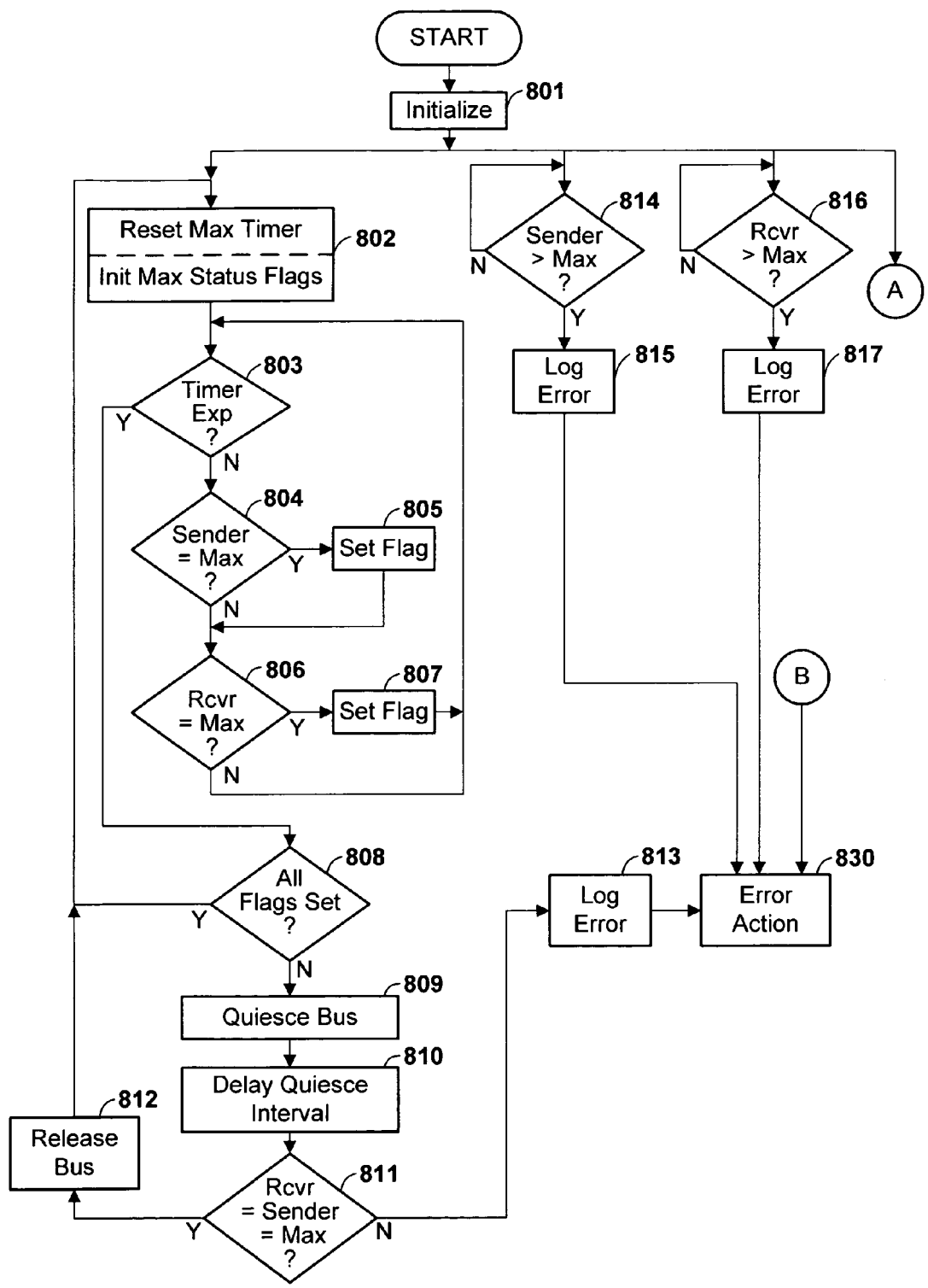
FIGS. 8A and 8B (herein collectively referred to as FIG. 8) are a decision diagram or flow diagram representing a logic process for detecting a credit accounting discrepancy, according to the preferred embodiment.
Figure 8B:
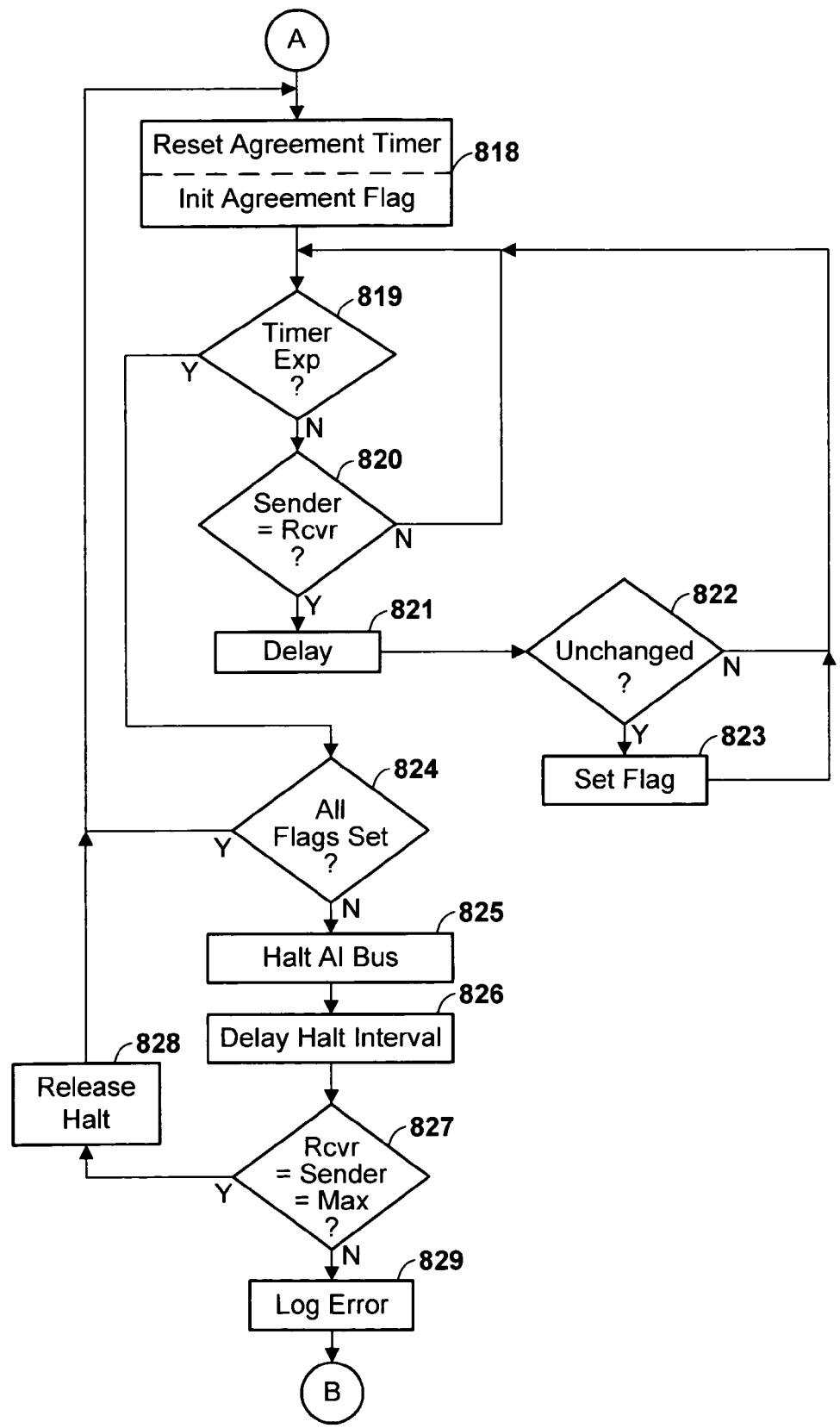

FIGS. 8A and 8B (herein collectively referred to as FIG. 8) are a decision diagram or flow diagram representing a logic process implemented by credit check logic 713, 714, for detecting a credit accounting discrepancy, according to the preferred embodiment. In the preferred embodiment, credit check logic 713, 714 implements credit checking in hardware as a set of timers, comparators, register flags, and so forth. However, such a process could alternatively be implemented in whole or in part in software as a sequence of instructions executed on a programmable processor.

Referring to FIG. 8, free credit registers 705, 706 and credit counters 711, 712 are initialized to an initial value (block 801), i.e., the maximum values for each respective channel, derived from configuration register 516. During operation, credit check logic 713, 714 concurrently performs four separate checks: (a) it checks for agreement between sender credits and receiver credits, represented as blocks 818–829; (b) it checks for loss of a credit by both sender and receiver, represented as blocks 802–813; (c) it checks for excessive credit in the sender, represented as blocks 814–815; and (d) it checks for excessive credit in the receiver, represented as blocks 816–817. For clarity of illustration, FIG. 8 shows a check of a single pair of sender and receiver credit values. However, it will be understood that a separate verification is concurrently performed on each pair of command credit values for each respective channel and each pair of data credit values for each respective channel. A single timer may be used for multiple verifications of multiple different channels The agreement check (a) above is performed by setting an agreement timer and initializing a flag for each pair of credit values to value signifying "not set" (block 818). During the timer interval, the logic compares the value of sender credits (from counter 711 or 712) with receiver credits (received over free credit bus 717 or 718), illustrated as block 820. If at any time the number of credits coincides (the 'Y' branch from block 820), the credits are continuously monitored during a relatively short delay period (block 821). If neither sender nor receiver credits changes during the delay period (the 'Y' branch from block 822), the flag corresponding to the credit value pair is set (block 823). When the timer expires (the 'Y' branch from block 819), the values of all flags are examined (block 824).

The short delay period at block 821 is sufficiently long to guarantee than any credit value change from a transaction in progress (or credit return) is propagated across the command or data bus, into registers 705, 706 and across free credit bus 717,718 to credit check logic 713, 714. I.e, if neither sender nor receiver value changes during the short delay period, then it can be assumed that there was no such transaction in progress or credit return in progress. In such a case, the fact that the sender and receiver have the same value for the entire delay period establishes agreement between the sender and receiver. The agreement timer is set (at block 818) to a value sufficiently long so that it is statistically probable that agreement will be detected, if it exists. I.e., although bus transactions are occurring during the time interval and credit values are being updated accordingly, the interval is sufficiently long so that it is statistically probable that for each channel, there will be at least one interval of inactivity sufficient to confirm agreement of the credit values of sender and receiver. If, at the expiration of the agreement timer, all flags have been set (all channel value pairs agree), the 'Y' branch is taken to block 818, the agreement timer is reset, and the process repeats.

If at least one credit value pair does not show agreement, then it is probable that a credit discrepancy exists. However, a credit discrepancy has not been definitely established. It may have been that the applicable channel was so busy during the agreement interval that it was impossible to obtain a sufficiently long period of credit value agreement. In order to verify the existence of a discrepancy, the AI bus is halted (block 825) and the check logic waits a predetermined halt interval (block 826). Halting the AI bus means that, after completing any packet in progress, no further packets are sent over the AI bus connection between sender and receiver, and the credit manager does not free any more credits. Because each bus direction operates independently with its own independent credit accounting, it is only necessary to halt the bus in one direction. This forced halt of the AI bus should result in agreement between sender and receiver credits. If, at the end of the halt interval, the sender and receiver credits agree (the 'Y' branch from block 827), then the credit check logic releases the halt (block 828) and returns to normal operation. If the sender and receiver still do not agree after halting the bus (the 'N' branch from block 827), then a credit discrepancy exists. In this case, the error is logged (block 829) and appropriate error recovery action is taken (block 830).

The check for simultaneous loss of a credit by both sender and receiver (check (b) above) is somewhat similar to the agreement check. In this case, a maximum value timer is set and a set of maximum value status flags for each channel for the sender and for the receiver is initialized (block 802). During the timer interval, the logic compares the value of sender credits (from counter 711 or 712) with a respective maximum credit value for each channel (block 804). The maximum credit value is derived from the configuration register (i.e., relatively static), and may be a different value for each channel. If at any time the number of credits coincides (the 'Y' branch from block 804), the corresponding flag for the sender and channel is set (block 805). During the timer interval, the logic also compares the value of receiver credits (from free credit bus 717 or 718) with the maximum credit value for each channel (block 806). If at any time the number of credits coincides (the 'Y' branch from block 806), the corresponding flag for the receiver and channel is set (block 807). When the timer expires (the 'Y' branch from block 803), the values of all flags are examined (block 808).

The maximum value timer is set (at block 802) to a value sufficiently long so that it is statistically probable that each channel will reach its maximum value at some time during the interval, assuming it has not lost a credit. Because reaching maximum credit may be dependent upon emptying a buffer or events external to the I/O bridge chip, it is expected that in normal operation a channel may operate with fewer than its maximum credits for a relatively long time. The maximum value timer is preferably set accordingly to a time period which is significantly longer than the agreement time interval. If, at the expiration of the maximum value timer, all flags have been set (sender and receiver have reached maximum values at least once on all channels), the 'Y' branch is taken from block 808 to block 802, the maximum value timer is reset, and the process repeats.

If at least one credit value pair does not reach its maximum, then it is probable that a credit discrepancy (particularly, a credit loss) exists. A credit loss has not been definitely established because the applicable channel may have been so busy during the maximum value interval that it was impossible to reach its maximum credit value (e.g., there was always something in the buffer). In order to verify the existence of a credit loss, the applicable bus is quiesced (block 809), and the check logic waits a predetermined quiesce interval for the bus to become fully quiescent (block 810). Quiescing the bus is a rather drastic action, which not only prevents new transactions from entering the bus but empties any buffers and downstream buses from the sender which might affect the return of credits. Quiescing the bus should force a return to the initialized state, in which all credits are returned to the sender. If, at the end of the quisce interval, the applicable sender counter 711, 712 and receiver register 705, 706 have reached the predetermined credit maximum (the 'Y' branch from block 811), then the credit check logic releases the bus from quiescent state (block 812) and returns to normal operation. If the sender and/or receiver still do not have the maximum credit amount (the 'N' branch from block 811), then a credit loss exists. In this case, the error is logged (block 813) and appropriate error recovery action is taken (block 830).

The checks for credits in excess of the maximum are relatively straightforward. Although credit counters and registers are being continually updated, at no instant should a counter or register ever contain more than the maximum available credits for the applicable channel. As shown in FIG. 8, the sender's counter values are compared to the maximum values for each respective channel (block 814), and if at any time a sender counter exceeds the applicable maximum (the 'Y' branch from block 814), an error is logged (block 815) and appropriate error recovery action is taken (block 830). Similarly, the receiver's counter values (from free credit buses 717, 718) are compared with the maximum values (block 816), and if at any time a receiver register value exceeds the applicable maximum (the 'Y' branch from block 816), an error is logged (block 817) and appropriate error recovery action is taken (block 830).

The error recovery action to be taken will depend on the nature of the error. In general, an agreement discrepancy or a credit in excess of the maximum allowable indicates some defect in the hardware, which is a relatively serious matter and may require disabling the bus or other drastic action. A loss of a credit by both sender and receiver might be due to any number of factors external to the I/O bridge chip, and would generally be less serious. However, at the very least it would be expected that the credit loss be reported to appropriate system diagnostics, and that some action might be taken to recover or reset the lost credit.

Data Alignment and Bus Width Adjustment

In accordance with the preferred embodiment, CI module 402 performs any required data alignment and bus width conversions between inbound and outbound I/O buses 406–408 coupled to I/O bridge chip 401. In order to simplify the logic required in each I/O bus interface component 403–405, the AI bus linking the I/O bus interface component to CI module 402 uses the same data alignment and bus width as the corresponding external I/O bus to which the I/O bus interface component is attached, where it is possible to do so. This means than the different AI buses connected to the CI module may have differing bus widths and differing data alignment, to match those of the corresponding external I/O bus. The AI bus architecture supports bus widths of 8, 16 or 32 bytes; where the attached external I/O bus is of a width which is not supported by the AI bus architecture, the I/O bus interface component will need to perform a conversion to a width supported by the AI bus architecture. The CI module architecture defines data alignment and bus width adjustment mechanisms for performing any required conversions between AI buses of different alignment and/or width.

Figure 9:
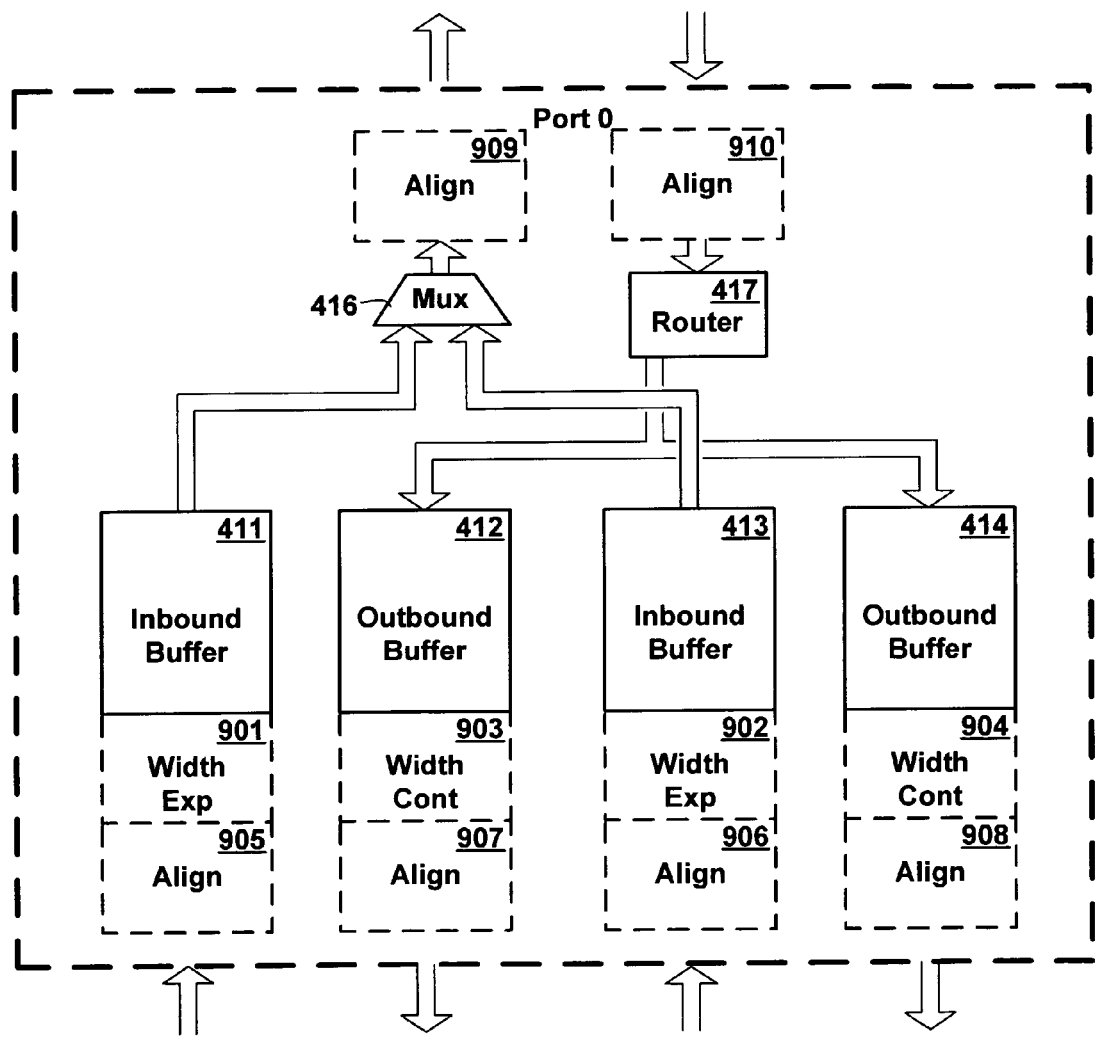
FIG. 9 is a representation of the major components of a data alignment and bus width adjustment mechanism with a central interconnect module of an I/O bridge unit, according to the preferred embodiment.

FIG. 9 is a representation of the major components of a data alignment and bus width adjustment mechanism with CI module 402, according to the preferred embodiment. In the illustration of FIG. 9, it is assumed that inbound I/O bus 406 is at least as wide, and uses a data alignment boundary at least as large, as any of outbound I/O buses 407,408, consistent with a typical configuration. I.e., in most computer systems, buses tend to get wider and align on larger boundaries as the data approaches the processor/memory bus. Therefore data may need to be aligned to a larger boundary and/or converted to a wider bus as it comes through the I/O bridge chip from an I/O device toward the processor/memory bus. Data moving in the opposite direction (toward an I/O device) may need to be aligned to a smaller boundary and/or converted to a narrower bus width. However, it should be understood that these assumptions are made herein only for clarity of illustration and explanation; architecturally, there is no such restriction, and the alignment and conversion structures illustrated and described herein could be constructed to operate on data flowing in the opposite direction.

The width of buffers 411–414 within CI module 402 matches that of the widest AI bus coupled to the CI module, which in the illustration of FIG. 9 is the AI bus at port 0, i.e., the AI bus which is coupled to inbound I/O bus interface component 403. If any AI bus coupled to the CI module has a smaller width than the width of the widest AI bus (the width of the buffers), then incoming data from that bus is converted to the wider width by width expansion logic 901, 902, before it is placed in the buffer, so that data in the buffer reflects the widest bus. When data received on a wider AI bus is removed from the buffer for transmission on a narrower AI bus, width contraction logic 903, 904 coupled to the buffer sequences segments of each buffer entry for transmission on the narrower AI bus in successive bus cycles.

In the exemplary embodiment illustrated in FIG. 9, it is assumed that outbound data always moves to a domain having the same data alignment or to a domain having smaller data alignment, while inbound data always moves to a domain having the same data alignment or a wider data alignment, depending on the alignment used on the I/O buses. Where alignment is required, it can either be performed either before the data enters a buffer in the CI module, as illustrated by alignment logic 905, 906, and 910, or as the data leaves the buffer for transmission on an AI bus, as illustrated by alignment logic 907, 908 and 909, or by a combination of such logic.

For illustrative purposes, width expansion logic 901, 902 is shown separately from alignment logic 905,906 at the input to the inbound buffers, and width contraction logic 903, 904 is shown separately from alignment logic 907,908 and the output from outbound buffers. However, where both alignment adjustment and bus width conversion are required, these are in fact related operations performed by closely coupled logic, as explained further herein. It will be understood that, depending on the bus widths and alignment boundaries of the various AI buses, it may be necessary to perform only bus width conversion, or alignment adjustment, or to perform both operations.

Although it is possible to perform alignment on either side of the buffer, it is generally preferred that any required alignment be performed on the input side of the buffers, i.e., by alignment logic 905, 906 or 910. Aligning on the input side of the buffers has several advantages: if data arriving at a CI module must be both aligned on a longer boundary and converted to a wider bus, these operations are optimally performed by closely coupled logic before the data is placed in the buffer; aligning on the input side avoids any delay due to alignment logic as the data leaves a buffer; the Pull transaction is only possible if data in the buffer has already been aligned; and in the case of inbound data, if the data must be both aligned on a larger boundary and converted to a wider bus, these operation are optimally performed by closely coupled logic before the data is placed in the buffer. However, aligning on the output side can in some cases reduce the amount of alignment hardware required, since multiple paths can share the same alignment logic.

Figure 10A:
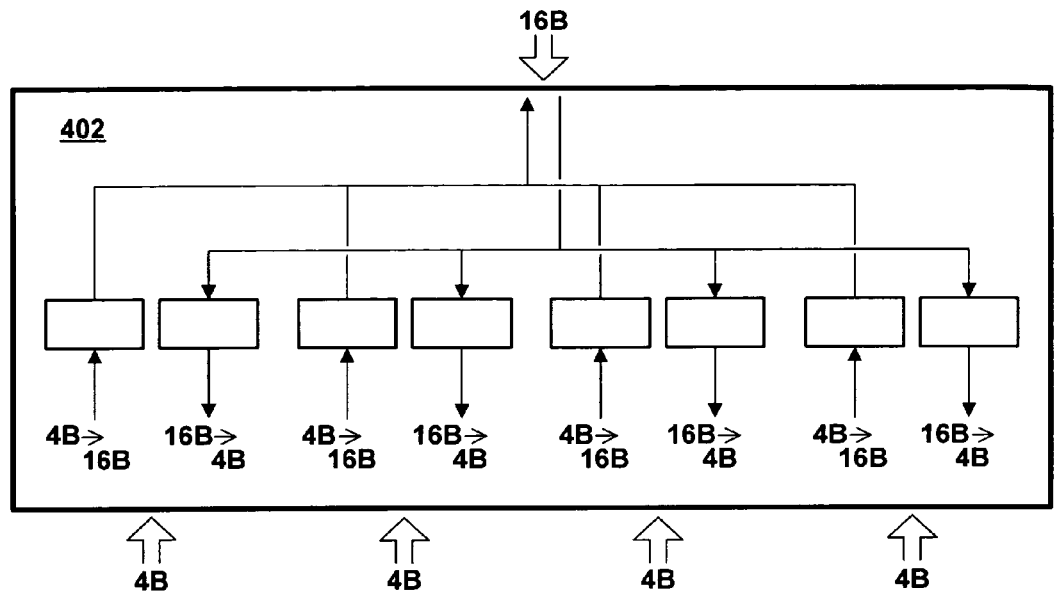
FIGS. 10A–10D illustrate various alternative configuration options for alignment hardware in a CI module, according to the preferred embodiment.
Figure 10B:
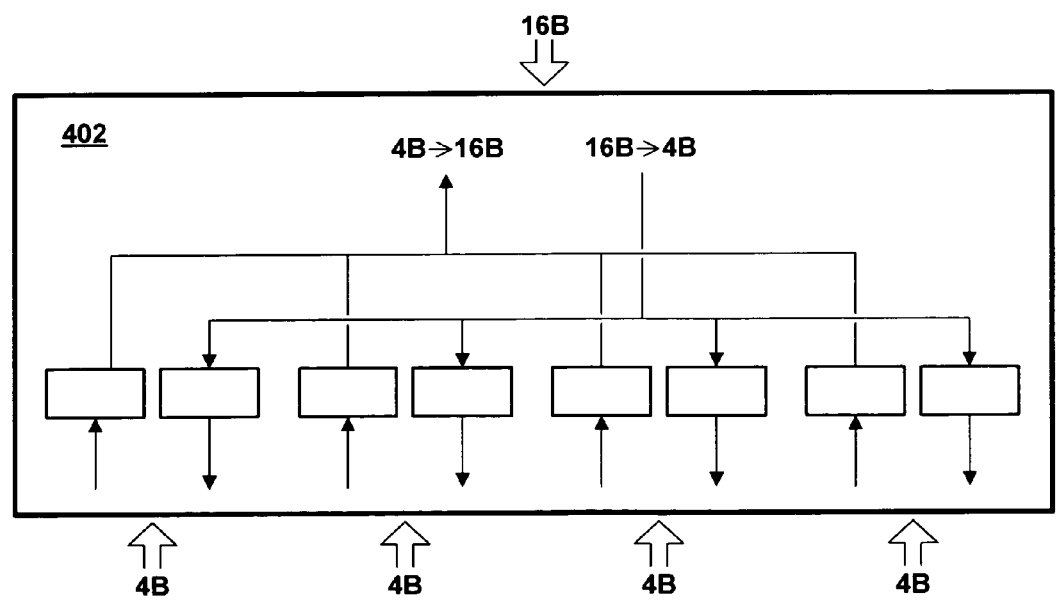
Figure 10C:
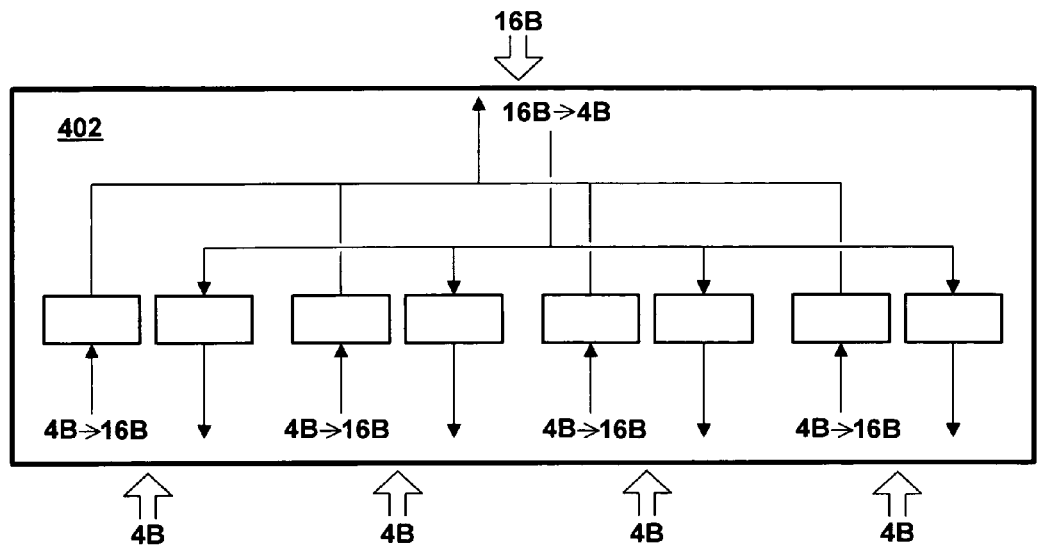

FIGS. 10A–10D illustrate various alternative configuration options for alignment hardware in a CI module having four outbound ports and a single inbound port. In the examples of FIGS. 10A–10D, it is assumed that the inbound port has a 16-byte alignment, and the outbound ports generally have a smaller alignment. Where the four outbound ports have a 4-byte alignment, FIGS. 10A–10C show three alternative configurations. It is possible to replicate the alignment hardware in each outbound port, converting from 4-byte to 16-byte as inbound data enters the port from the AI bus and before it reaches the buffer (alignment location 905, 906), and converting from 16-byte to 4-byte as outbound data leaves the buffer for transmission on the AI bus (alignment location 907, 908), as represented in FIG. 10A. It is alternatively possible to have a single set of shared alignment hardware in port 0 only, converting from 4-byte to 16-byte as the inbound data leaves the buffer for the inbound AI bus (alignment location 909), and for 16-byte to 4-byte as outbound data enters port 0 from the inbound AI bus (alignment location 910), as represented in FIG. 10B. If is further possible to have a single shared alignment logic for outbound data and replicated alignment logic for inbound data, converting from 4-byte to 16-byte in each individual outbound port as inbound data enters the port from the outbound AI bus and before it reaches the buffer, (alignment locations 905, 906) and converting from 16-byte to 4-byte as outbound data enters port 0 from the inbound AI bus and before it reaches the buffer (alignment location 910), as represented in FIG. 10C. In general, the configuration of FIG. 10A would not be preferred, but is shown here to represent the possibility of the combination. The configuration of 10B minimizes the amount of hardware required, but the configuration of 10C, which performs all alignment before the data is placed in the buffers, may be preferable for performance or other reasons.

Figure 10D:
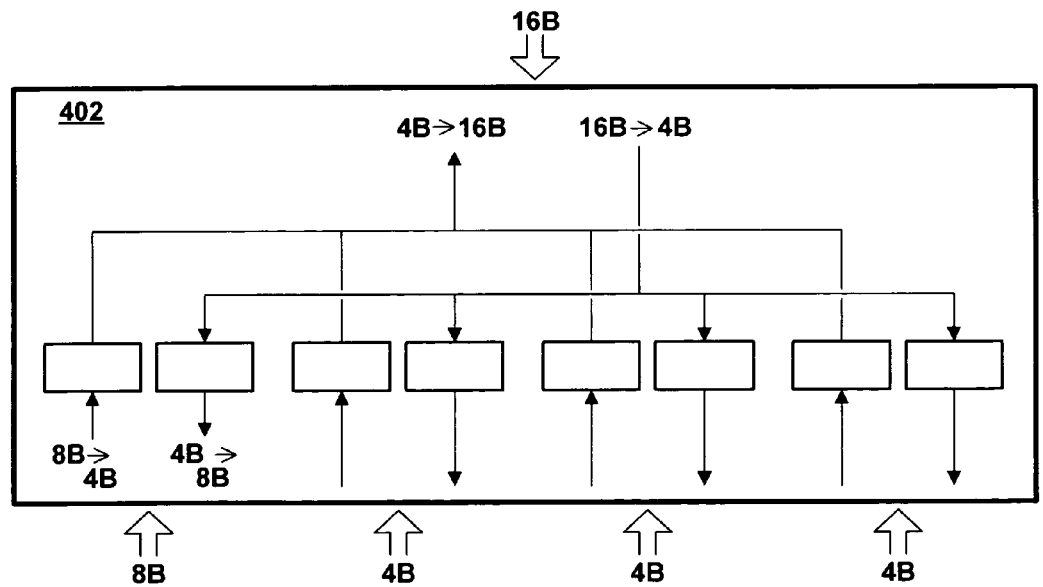

Hardware efficiencies can be realized even if the outbound I/O bus interfaces do not all use the same alignment by using alignment hardware at both the input and output from the buffers in some cases. For example, if one of the four outbound AI buses using an 8-byte alignment and the remaining three use a 4-byte alignment, it would be possible to use the configuration of FIG. 10A, in which the port for the 8-byte aligned bus has corresponding 8-byte to 16-byte alignment hardware. It would alternatively be possible to use a configuration such as that shown in FIG. 10D, which requires less hardware. In the alternative of FIG. 10D, both the input and output paths at port 0 have 4-byte to 16-byte (or reverse) alignment hardware (alignment locations 909, 910). This alignment hardware at port 0 is sufficient to perform any required conversions for data going through the three outbound ports coupled to 4-byte aligned AI buses. The single port coupled to an 8-byte aligned AI bus additionally contains 8-byte to 4-byte (or reverse) alignment hardware (alignment locations 905, 907) to conform to the alignment of the other three outbound ports. It will be recognized that other combinations are possible.

For purposes of data alignment and bus width conversion, bus transactions may be divided into three categories. A first category is command-only transactions, i.e., those which contain no data. Since the command bus is always the same format, no alignment or width conversion is performed with respect to commands. A second category is transactions containing data, in which the command contains a data address and length. For clarity, these transactions are referred to herein as write transactions since write transactions are typical of transactions containing a data address, although it will be understood that the second category is not necessarily restricted to write transactions. The third category is transactions containing data, in which the command contains a length, but not an address, of the data. These are typically read return transactions.

In the preferred embodiment, a read across the bus is split into two bus transactions: a read request and a read return. The read request is a command-only transaction containing the address and length of data to be accesses. The read return contains the data, but not the data address. I/O bridge unit 401 is merely a conduit for these separate transactions, and does not attempt to match a read return with an earlier read request (although such matching is typically performed at a higher level of the system). Therefore the I/O bridge unit, and specifically CI module 402, does not know the address of data in a read return, and can not align the read return based on the address.

Data alignment in bus transactions of the second category can be performed using conventional alignment techniques which use the address of the data to determine a required data shift, if any. For example, when moving from a smaller to larger alignment boundary, data on the bus may need to be shifted right (where byte addresses increase moving left to right). The right shift amount is:

(StartAddr mod LB)—(StartAddr mod SB), where StartAddr is the starting address of the data transaction, SB is the small alignment boundary, and LB is the large alignment boundary. When moving from a larger to a smaller boundary, the data is shifted left by the same amount. Since these boundaries are powers of two, the shift amount is easily obtained as a logical function of several significant address bits, without actually performing a complete address subtraction.

Data alignment in bus transactions of the third category is performed by imposing certain constraints on the alignment and length of the read return data entering CI module 402. Specifically, any read return transaction must conform to one of the following three rules:

(1) the data begins on a boundary the size of the widest bus, and has a length at least the size of the largest bus width;

(2) the transaction length is a power of two, and the data begins on a boundary that matches the transaction length; or (3) the data begins and ends on any arbitrary byte boundary, but does not cross a boundary the size of the smallest data alignment boundary or narrowest bus, whichever is less.

From an architectural standpoint, the I/O interface component sending data on the AI bus having the smaller alignment boundary (generally the outbound I/O bus interface component 404, 405) to the CI module must guarantee that any read return transaction it transmits conforms to the above rules. Similarly, the I/O interface component sending data on AI buss having the larger alignment boundary (generally the inbound bus interface component 403) must guarantee that any read return it transmits conforms to the above rules, and in the case of rules 2 or 3, is duplicated if required on its bus, as explained herein.

In some cases, the nature of the external I/O bus attached to the I/O interface component might be such as to guarantee compliance with these rules. I.e., each I/O interface component is designed to provide an interface to a specific type of external I/O bus, having known characteristics. If the type of I/O bus for which an I/O interface component is designed always complies with these rules, then the I/O interface component can simply pass through any transaction it receives from the external I/O bus to the internal AI bus, without doing anything further. Where the external I/O bus itself does not guarantee compliance, the I/O interface component can either enforce the rules with respect to outgoing read commands, or enforce the rules with respect to read return transactions.

Enforcing the rules with respect to outgoing read commands means that the length and/or address of any read command which might result in a read return transaction is altered, if necessary, so that the read return complies with the rules. Enforcing the rules with respect to a read return means that there is no change to the outgoing read command, but the read return data transaction is altered, it necessary, to comply with the rules. Where moving from a smaller to larger alignment boundary, the latter enforcement mechanism is generally only possible where the attached external I/O bus carries sufficient information (such as the address and length) to enable the I/O bus interface to make the appropriate determination. In either case, the rules are preferably enforced by padding a transaction (increasing its size so that it begins and/or ends on an appropriate boundary), although in some cases it may alternatively be possible to break a single transaction into two or more so that an alignment boundary is not crossed.

When handling a read return transaction and aligning from a smaller boundary to a larger boundary, the alignment logic uses the length of the data to determine whether rule 1 applies. If the data is at least as long as the widest bus, then rule 1 applies, and no alignment is required. If the data is less than the widest bus length, then it is assumed that one of rules 2 or 3 applies, but not rule 1. In this case the alignment logic determines a "duplication size" as the larger of (a) the transaction length for transactions conforming to rule 2, or (b) the smallest data alignment boundary or bus width, for transactions conforming to rule 3. The alignment logic duplicates the amount of data equal to the duplication size to create a string of data equal to the widest bus width. For example, if an 8-byte long transaction is received on an 8-byte wide AI bus, aligned to 8 bytes, and is to be re-transmitted on a 32-byte bus, having a 32-byte alignment, the duplication size (rule 2) is 8, and the data string is duplicated four times on the 32-byte bus. In this case, it is known that StartAddr mod 8=0, and therefore StartAddr mod 32=0, 8, 16, or 24. Regardless of the StartAddr, the 8 bytes of data will be at a correct location on the 32-byte bus.

In the case where the duplication size is less than the width of the incoming bus, the I/O interface component sending data on the bus to the CI module must similarly duplicate the data it is driving to the CI module. This situation can arise where the sending I/O interface component is driving the wider bus, and the data will be re-transmitted by the CI module on a narrower bus or bus having smaller alignment. It can also arise where the sender is driving the narrower bus, if the narrower bus has a smaller alignment than its bus width. For example, if a 3-byte transaction at address 4 is being sent on an 8-byte bus having an alignment of 4 bytes, then the data is duplicated in the first 4 and second 4 bytes of the 8-byte bus.

Where data is moving from a wider bus to a narrower bus or smaller alignment boundary, alignment logic in the CI module isn't required to shift or duplicate read return data. The data is already aligned (in the case of rule 1 transactions) or duplicated (in the case of rule 2 and 3 transactions) as it enters the CI module. The CI module can therefore transmit an amount of data at least as large as the transaction length on the narrower bus, starting with the first byte from the wider bus.

AI Bus Operation

The AI bus architecture is the common bus architectural design and protocol used in all major internal data buses within I/O bridge unit 401. In the preferred embodiment, these buses connect functional components, specifically I/O bus interface components 403–405, with CI module 402. However, the bus architecture supports a connection between any arbitrary pair of chip internal components. It would be possible to design an AI bus according to the AI bus architecture which directly connects two functional logic components, without going through a central interconnection module. The architecture supports buses of varying data width (8, 16 or 32 byte), which can be matched to the different functional modules, as explained above.

Figure 11:
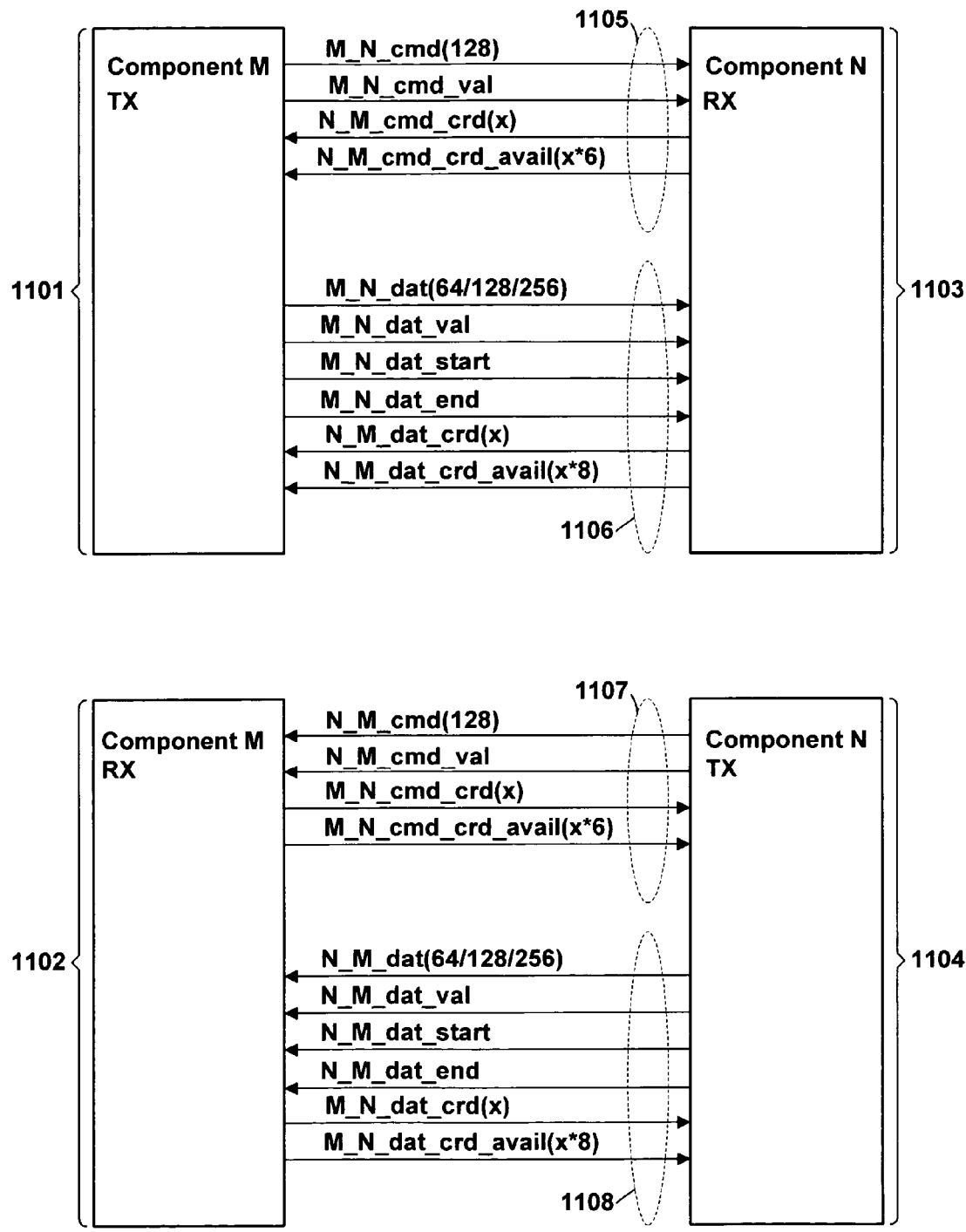
FIG. 11 is a simplified representation showing a base set of AI bus signals for a single AI bus connection between two components, according to the preferred embodiment.

As explained above, the AI bus architecture supports three data transfer protocols: a base Push, and extended Push, and a Pull. FIG. 11 is a simplified representation showing a base set of AI bus signals for a single bi-directional AI bus connection between two components, i.e., signals for supporting the base Push protocol only, according to the preferred embodiment. As shown in FIG. 11, each device coupled to an AI bus contains a transmit portion 1101, 1104 and a receive portion 1102, 1103, which are symmetrical. Each transmit portion transmits data and commands across a set of unidirectional signal paths, and each corresponding receive portion receives data and commands from the unidirectional signal paths. The signal paths comprise a set of command bus signal paths 1105, 1107 (also referred to herein as the "command bus") and a set of data bus signal paths 1106, 1108 (also referred to herein as the "data bus"). For clarity of illustration, certain signals, particularly parity signals and data error signals, have been omitted from the representation of FIG. 11.

Each command bus signal path portion 1105, 1107 comprises a 128-bit command (cmd), and 1-bit command valid (cmd_val) signal transmitted by the corresponding transmit portion 1101, 1104. The command, which contains multiple fields, is transmitted on the 128-bit command signal lines; command valid is raised to indicate a valid command on the 128-bit command signal lines. Among the fields included in the 128-bit command is a command type, a transaction length (i.e., the number of data bytes in the transaction), a channel ID, a port ID, a pull data index (used only to identify a buffer location for use in a Pull transaction), and a data address. The command bus further comprises a set of 1-bit command credit return line (cmd_crd) and a set of 6-bit free command credit (cmd_crd_avail) buses, which are transmitted by the receiver to the sender, the function of which has been previously explained.

In the preferred embodiment, the number of command credit return lines and 6-bit free command credit buses is equal to the number of channels using the particular physical link, represented in FIG. 11 as x. In the case of port 0, credits associated with different paths are consolidated. Specifically, for inbound transactions, the command credits returned on a command credit return line and shown on a free credit command bus represent a pooled number of credits in the corresponding channel available to all inbound buffers 502 in all ports 501. For outbound transactions, consolidation is a little more complex. Each outbound buffer 504 is independent of any other outbound buffer 504 in a different port. In this case, the command credits shown on a free credit command bus represent the number of credits in the corresponding channel available in the outbound buffer 504 currently providing the least number of credits. Credits are returned according to the changes in this number. For example, if outbound buffer A has current capacity for 4 additional commands on channel 1 and outbound buffer B has current capacity for 2 additional commands on channel 1, transmitting a command bound for buffer A on channel 1 will not cause any change in the value on the free credit command bus; the credit is returned immediately (without waiting for a space to be freed in buffer A), to restore the sender's credit count. If, however, a command bound for buffer B is transmitted on channel 1, then the value on the free command bus is decremented, and the credit is not returned until space is freed in buffer B.

It will be observed that one consequence of consolidating credits on port 0 is that a bottleneck in a single outbound port may affect outbound transactions to all ports. It would alternatively be possible to provide separate credit return lines and free credit buses for each outbound port and channel. For example, where a CI module contains four ports coupled to corresponding outbound I/O interface components 405, 406, and each port allocates its buffers into eight channels, then the physical AI bus at port 0 could contain 32 command credit return lines and 32 6-bit command credit available buses.

Each data bus signal path portion 1106, 1108 comprises data (dat), which can be either 64-bits, 128-bits or 256-bits, a 1-bit data valid (dat_val) signal, a 1-bit data packet start (dat_start) signal, and 1-bit data packet end (dat_end) signal, all transmitted by the corresponding transmit portion 1101, 1104. Data valid is raised to indicate valid data on the data signal lines. Data packet start is raised on the first bus beat of a data packet, and data packet end is raised on the last bus beat of a data packet. The data bus portion further comprises a set of 1-bit data credit return lines (dat_crd) and a set of 8-bit free data credit (data_crd_avail) buses, the function of which has been previously explained. As in the case of command credits, the number of data credit return lines and 8-bit free data credit buses is equal to the number of channels using the particular physical link. In the case of port 0, data credits associated with different paths are consolidated, although they could alternatively be provided on separate sets of lines, in the same manner as explained above with respect to command credits.

Using the base Push protocol, the sender sends a command on the command bus before or concurrently with the first beat of data on the data bus. The dat_start signal is asserted with the first data beat, and another data beat is transmitted with each successive cycle of the bus clock until transmission is complete. The dat_end signal is asserted on the final data beat (which may be the same as the first). Credits are returned independently, as described previously.

Figure 12A:
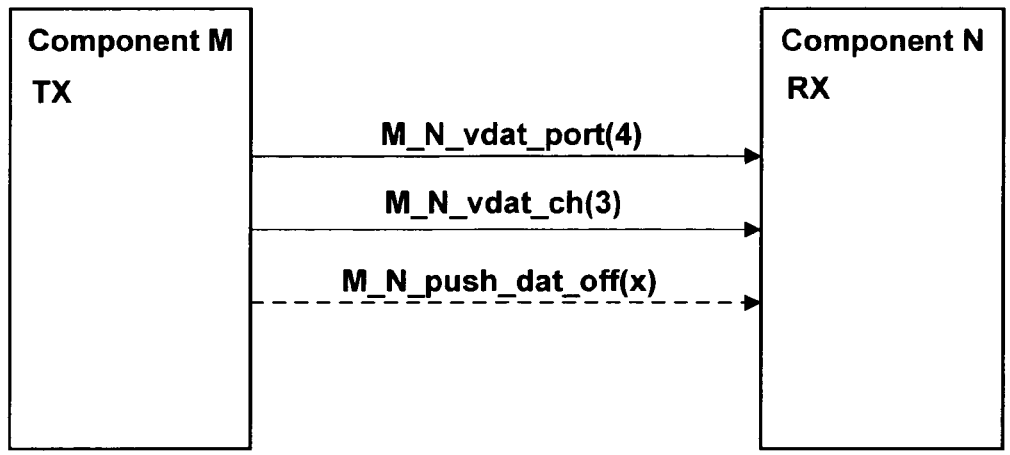
FIGS. 12A and 12B represent additional AI bus signal lines required for supporting an extended Push protocol and Pull protocol, respectively, according to the preferred embodiment.
Figure 12B:
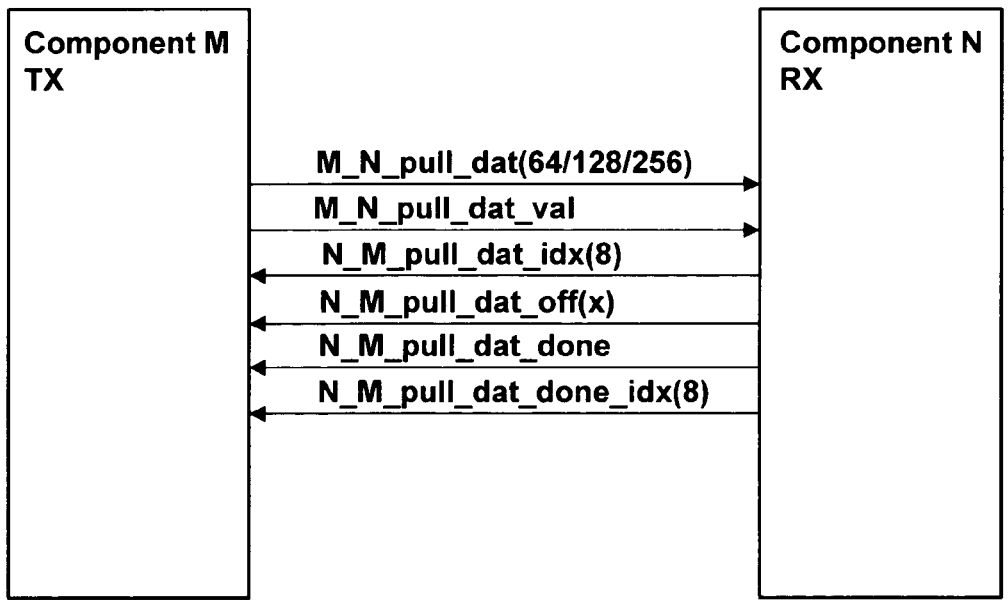

Several lines (in addition to those shown in FIG. 11) are required to support an extended Push or a Pull protocol. FIG. 12A represents additional AI bus signal lines required for supporting an extended Push protocol in a single transfer direction. FIG. 12B represents additional AI bus signal lines required for supporting a Pull protocol in a single transfer direction. Support for the extended Push or Pull protocols need not be (and generally is not) bi-directional.

Referring to FIG. 12A, 4-bit port ID (vdat_port), and 3-bit channel ID (vdat_ch) are included in the data bus portion 1106, 1108 of the AI bus to support the extended Push. Data bus portion may optionally include a multi-bit push data offset (push_dat_off). I.e., when using extended Push protocol, each data beat includes the port ID and channel ID (and optionally, the push data offset), and the data on vdat_port and vdat_ch (and push_dat_off, where used) is valid only when the data valid (dat_val) line is raised. Although port and channel information is included in the command, the extended Push protocol further includes it in the data. Using the extended Push protocol, it is possible to send the data before the command, as, for example, when command credits are unavailable but data credits are. The extended Push protocol provides further flexibility in two additional respects: the sender may restart a transaction in the middle of the transfer by re-asserting the dat_start signal; and the sender may pace a transaction by skipping a bus clock cycle (not asserted dat_val). Furthermore, where the optional push data offset is used, the sender can send portions (beats) of data within a packet in any arbitrary order.

Referring to FIG. 12B, a pull data bus (pull_dat), which can be either 64, 128, or 256 bits wide, a pull data valid line (pull_dat_val), an 8-bit pull data index (pull_dat_idx), a multi-bit pull data offset (pull_dat_off), a pull data done line (pull_dat_done), and an 8-bit pull data done index (pull_dat_done_idx) are included in the data bus portion 1106, 1108 of the AI bus to support the Pull protocol.

When using the Pull protocol, the sender initially sends a command to the receiver, the command containing a pull data index in one its fields. The receiver is thereafter in control of transaction timing. The receiver initiates the transfer by asserting the pull data index and pull data offset. The pull data index indicate a buffer location, and the offset an offset from the $0^{th}$ element at the indexed buffer location. The sender then places the pulled data (at the indicated buffer location and offset) on pull_dat, and asserts pull_dat_val. The receiver repeats with a new value of the pull_dat_off until the transaction is complete. Sometime after the transaction is complete, the receiver releases the buffer space by placing the buffer index on pull_dat_done_idx, and asserting pull_dat_done. In response to pull_dat_done, the sender releases the buffer space identified by the index. Note that the assertion of pull_dat_done is under the control of the receiver, which may elect to keep the buffer space for some time after the transaction completes. This allows the receiver to re-pull the data from the buffer space an indefinite number of times. Since the receiver may have no buffer of its own, the ability to re-pull the data from the sender's buffer is useful in some communications protocols used in external I/O buses. Like the push data offset, the pull data offset also allows a receiver to pull data from the buffer in any arbitrary order. This capability may be useful for accommodating certain external I/O bus protocols, where the receiver (an I/O bus interface component) has no buffering capability of its own to re-order the data within a packet.

Figure 13A:
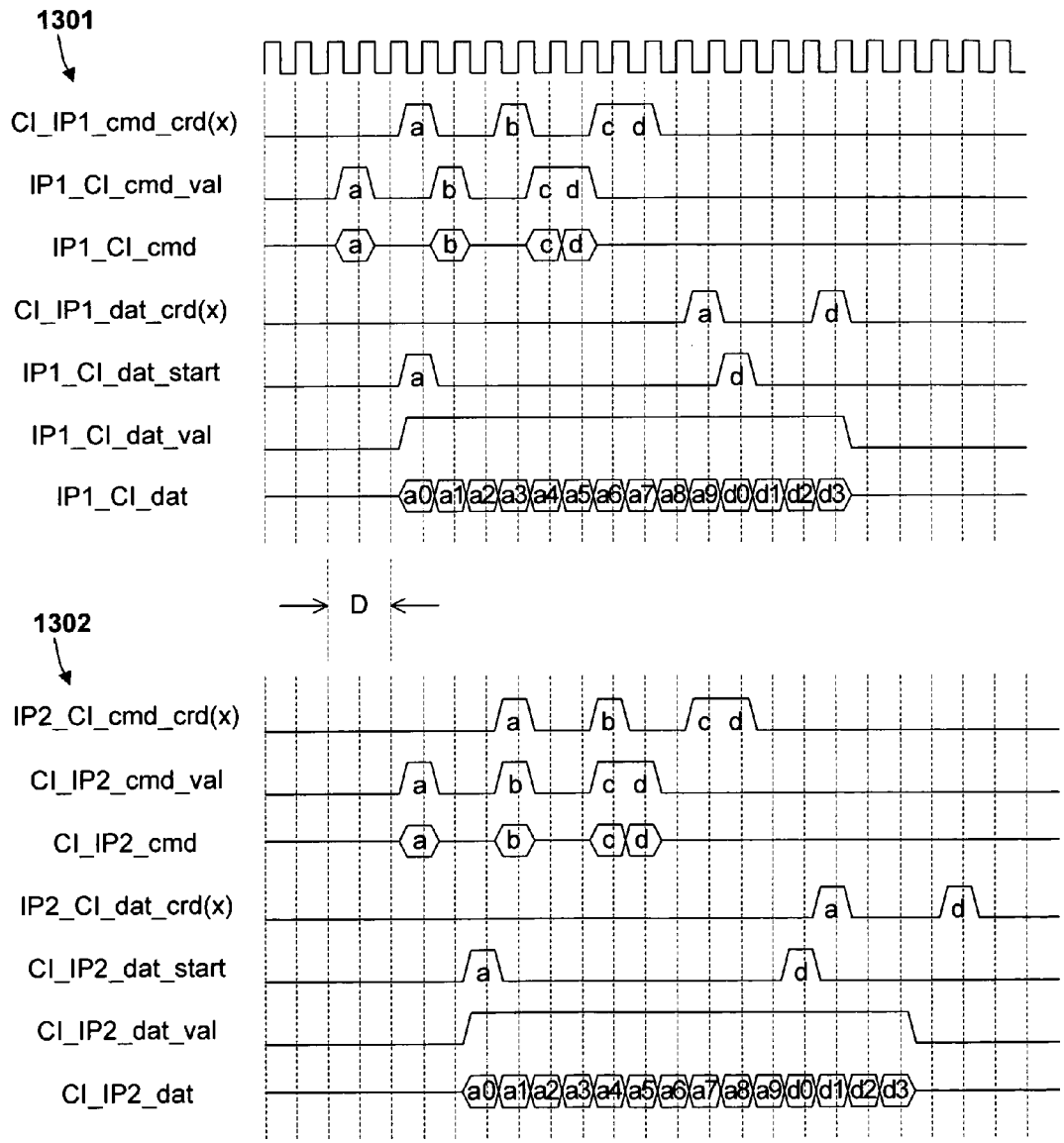
FIGS. 13A and 13B are timing diagrams showing a series of typical transactions communicated from one functional component module to another through a central interconnect module, according to the preferred embodiment.
Figure 13B:
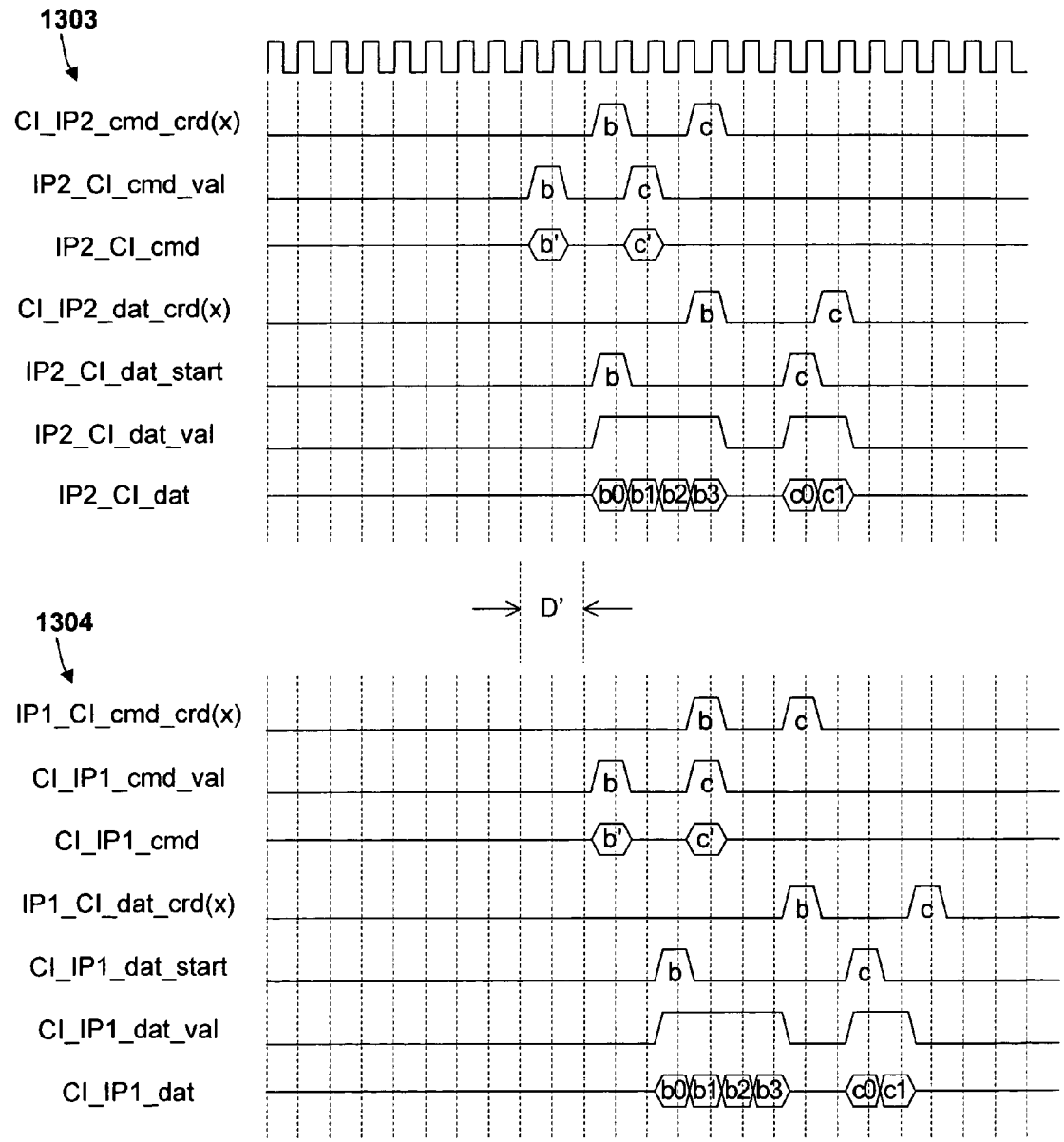

FIGS. 13A and 13B are timing diagrams showing a series of typical Push transactions communicated from one functional component module to another, through CI module 402. In the timing examples of FIGS. 13A and 13B, the functional component modules are designated IP1 and IP2, the transactions initiating in IP1. FIG. 13A represents timings for four transactions, designated a, b, c and d, transmitted from IP1 to the CI, and re-transmitted by the CI to IP2. Transaction a is a write containing 10 data beats, transactions b and c are read requests, and transaction d is a write containing 4 data beats. FIG. 13B represents timings for two read return transactions, designated b' (containing 4 data beats) and c' (containing 2 data beats), corresponding to read requests b and c, respectively, transmitted from IP2 to the CI, and re-transmitted by the CI to IP1. For simplicity of illustration, it is assumed that all buses have the same width and use the same data alignment; where the alignment and/or bus width varies, the number of data beats in a given transaction may change as it passes through the CI module.

Referring to FIG. 13A, timing set 1301 shows timings of a selective set of lines on the AI bus for outbound transactions from module IP1, i.e., the bus on which IP1 transmits commands and data to the CI module. Timing set 1302 shows timings of a selective set of lines on the AI bus for outbound transactions being transmitted from the CI module to IP2.

Transaction a is initiated when module IP1 places a command on 128-bit IP1_CI_cmd bus, and simultaneously asserts IP1_CI_cmd_val. Transactions b, c and d are similarly initiated in subsequent cycles. In the example of FIG. 13A, module IP1 places data on IP1_CI_dat bus, and asserts IP1_CI_dat_val and IP1_CI_dat_start, two cycles later. IP1_CI_dat_start is asserted for a single cycle for each transaction carrying data (i.e., for transactions a and d), which IP1_CI_dat_val is asserted continuously while valid data is being transmitted. The start of data for transaction d occurs 6 cycles after the corresponding command, because the data bus is occupied with data from transaction a. It will be observed that no data is transmitted for transactions b and c, these being command-only transactions.

In the base Push, data can be started in the same cycle as the command, or in a later cycle. In the extended Push, data can be started before the command. However, in either case transaction order must be maintained. I.e., it is not possible to transmit command1, followed by command2, on the command bus, and to transmit data2 (corresponding to command2), followed by data1 (corresponding to command1), on the data bus. Furthermore, in some implementations, the protocol may impose a limit on the number of cycles delay between the command and the start of data; although FIG. 13A shows a 6-cycle delay between the command for transaction d and the start of data, a delay of such length may be unacceptable in these implementations, and IP1 would accordingly wait to a later cycle to send the command.

After receiving each command, CI module returns a command credit to IP1 by pulsing CI_IP1_cmd_crd(x), where x corresponds to the channel of the command. Similarly, after completion of each data transmission, CI module returns a data credit to IP1 by pulsing CI_IP1_dat_crd(x). Although command and data credit returns must follow the respective transmissions, the delay of command and data credit returns may vary. As explained previously, due to credit consolidation on port 0, a credit might be returned immediately, or might be returned when the CI module buffer space is freed up.

After some delay period "D", which may vary with each command, depending on the number of transactions waiting in the buffers, availability of credits, and other factors, the commands received in the CI module are re-transmitted to IP2, by placing the commands on CI_IP2_cmd bus and simultaneously asserting CI_IP2_cmd_val. Data is re-transmitted from CI to IP2 as before on CI_IP2_dat bus, asserting CI_IP2_dat_start at the first bus beat of each transaction and CI_IP2_dat_val continuously for each bus beat of valid data. Although a single bus clock is shown in FIG. 13A for clarity of illustration, in fact the bus clock for signals 1301 may be different from the bus clock for signals 1302. Typically, where the integrated circuit chip is an I/O bridge unit, and the functional components are I/O bus interfaces, two different clock domains are used to match different clock domains of the respective external I/O buses attached to functional components IP1 and IP2.

Command and data credits are asynchronously returned by IP2 according to the capacity of IP2 to receive additional commands and data, using IP2_CI_cmd_crd(x) and IP2_CI_dat_crd(x), respectively. In general, if IP2 is an I/O bus interface component for an external I/O bus, credits are returned according to the capacity of the device at the other end of the bus to receive additional commands or data.

The read return transactions b' and c' proceed similarly in the opposite direction. Referring to FIG. 13B, timing set 1303 shows timings of a selective set of lines on the AI bus for inbound transactions from module IP2, i.e., the bus on which IP2 transmits commands and data to the CI module. Timing set 1304 shows timings of a selective set of lines on the AI bus for inbound transactions from the CI module to IP1.

The read return is a separate bus transaction, which is not required to adhere to any timing constraint with respect to the original read request. In some cases, such as a read request transmitted via an external I/O bus to a long latency data storage device, the read return may follow the read request by an very large number of bus cycles. When the read return is available in IP2, IP2 initiates the read return by driving IP2_CI_cmd bus and asserting IP2_CI_cmd_val. The read return data is transmitted from IP2 to the CI as before on IP2_CI_dat bus, asserting IP2_CI_dat_start at the first bus beat of each transaction and IP2_CI_dat_val continuously for each bus beat of valid data. After some variable delay D', the CI module then re-transmits the read returns to IP1 in a similar manner. Command and data credits are asynchronously returned by the CI to IP2, and by IP1 to the CI, as previously explained.

IC Design using VHDL

In one aspect of the preferred embodiment, a very high speed integrated circuit (VHSIC) hardware definition language (VHDL) design library includes a predefined CI module and interconnection parameters for connecting multiple functional component modules using an AI bus architecture, as described herein. When designing an integrated circuit chip, the data communications interconnections among multiple functional modules are generated by incorporating the CI module design and specifying the required interconnection parameters, rather than designing individual data interconnections. A high-level flow diagram of a design method according to the preferred embodiment is shown in FIG. 14.

Figure 14:
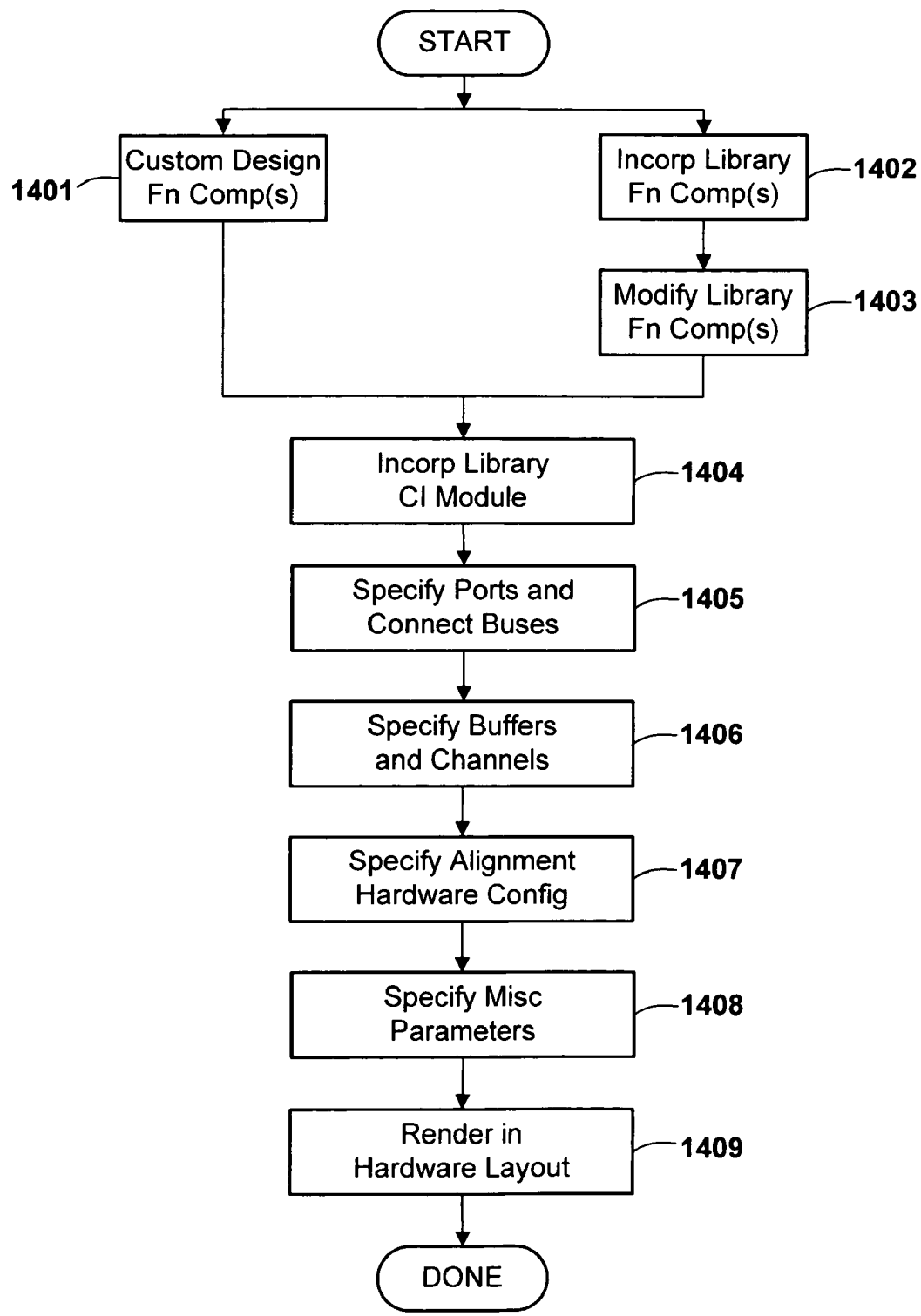
FIG. 14 is a high-level flow diagram of a design method for designing an integrated circuit chip using an interconnection module, according to the preferred embodiment.

Referring to FIG. 14, a chip designer designs multiple functional internal chip components. These can be designed either as custom designs (represented by block 1401), or by incorporating one or more functional component designs from a library of such designs (block 1402), and optionally modifying one or more of the library designs to suit the desired function (block 1403). Often, a chip will have a combination of custom designed functional component modules and library functional component modules. Where the chip is intended to function as an I/O bridge unit, it will be appreciated that I/O bus interface component designs often exist in libraries for standard protocol I/O buses, and therefore it is generally possible to obtain an appropriate interface module design from a library of such designs.

The chip designer incorporates the CI module definition from the library (block 1404). The designer then specifies the CI module ports and connections to the CI module from each of the functional component modules (block 1405). I.e., for each functional component module to be connected to the CI module, the chip designer specifies the connection, and certain AI bus parameters for the connection, such as the data bus width and whether any of the extended protocols (extended Push or Pull) are to be supported.

The chip designer further specifies the paths supported by the CI module, buffers and channels (block 1406). Specifically, the CI module does not necessarily support a path between each arbitrary pair of connected functional modules. In the exemplary embodiment described herein, an I/O bridge chip contains an inbound I/O interface component and multiple outbound I/O interface components. The CI module supports a path between the inbound I/O interface component and each outbound component, but not between two outbound components. If the library design is specifically for a CI module having a 1-to-N connection (as in the case of the I/O bridge chip), then the designer specifies which functional module is connected to port 0 of the CI module. In the more general case, individual paths may be specified. The designer also specifies the sizes of the buffers, and number of channels in each path.

The chip designer further specifies the alignment hardware configuration required, if any (block 1407). I.e., where the buses do not all use the same alignment and width, the designer specifies the placement of required alignment (on buffer inputs or buffer outputs or both), and the alignment boundary manipulation performed by each alignment logic. The chip designer may further specify any of various miscellaneous CI module parameters (block 1408). When the chip designer is done specifying the design, the design is rendered into a hardware layout by conventional automated design tools (block 1409).

ALTERNATIVES

A particular embodiment and alternatives of the invention have been disclosed herein. Additionally, it has been disclosed that certain aspects of the preferred embodiment might be differently implemented, without necessarily describing in detail each possible alternative implementation. In addition to any variation or alternative above disclosed, the following alternatives or variations are possible within the scope of the present invention.

In the preferred embodiment, two separate comparisons are made with a respective credit value from the free credit bus and a maximum credit value from a configuration register, over respective separate time intervals. However, a credit loss detection mechanism in accordance with the present invention might make only a single comparison, to either a separately maintained credit value or to a maximum credit value. Furthermore, if two comparisons are made, they could alternatively be made during the same time interval.

In the preferred embodiment, a credit loss detection mechanism is used in an internal bus within an integrated circuit chip. However, a credit loss detection mechanism in accordance with the present invention is not necessarily limited to chip internal buses, and could be used for external buses as well. Where such a credit loss detection mechanism is employed in an external bus, it may be desirable to use a different mechanism (other than the dedicated free credit bus) for providing a credit count from the receiver, in order to reduce the number of physical lines. For example, lines which are infrequently used may be time multiplexed to provide a free credit count.

In the preferred embodiment, logic in the sender compares the sender's local record with the credit value from the receiver. However, it would alternatively be possible to place the comparison logic in the receiver, and to transmit the value from the sender's local record over a free credit bus or other communications medium.

In the preferred embodiment, the bus protocol supports separate transmission of a command and data associated with the command, a separate credit count being maintained for the command and for the data associated with the command. However, in an alternative embodiment, a joint credit count might be maintained for data transactions, in which the command and the associated data are transmitted together if credit is available.

In the preferred embodiment, the CI module and associated internal buses are employed in an I/O bridge unit of a general purpose computer system for bridging between different communications buses. However, a CI module and associated internal buses in accordance with the present invention could be used in any of various integrated circuit chips for performing any of various functions, and such chips need not be intended for use in a general purpose digital computer system, but could be used in a variety of digital devices.

In the preferred embodiment, bus transactions are allocated to multiple channels which are used for transaction arbitration, each channel having its own independent credit accounting. However, a communications bus and associated hardware in accordance with the present invention need not employ a channel-based arbitration scheme, need not allocate buffer space to different channels, and need not assign transactions to channels.

In the preferred embodiment, the central interconnect module contains multiple buffers by which data being transferred from one functional component module to another is buffered in the central interconnect module, the buffers being shared by both the sending functional module and the receiving functional module. However, in an alternative embodiment, a CI module in accordance with the present invention need not contain shared buffers, and in an alternative embodiment each functional component module could contain its own buffers.

In the preferred embodiment, alignment hardware in the CI module performs alignment according to pre-defined criteria, and in particular aligns read return operations without data addresses. However, a CI module and associated internal buses in accordance with the present invention need not contain any alignment mechanism, and need not support any form of read return operation, or operation which does not contain a data address or other indication of data alignment.

In the preferred embodiment, various operating parameters of a CI module and its associated buses are programmable according to the contents of one or more programmable configuration registers. However, a CI module and associated internal buses in accordance with the present invention need not be programmable, or fewer, other, or additional parameters may be programmable.

In the preferred embodiment, a CI module is defined in a VHDL design library and incorporated into an integrated circuit chip design by specifying certain bus and internal operating parameters. However, a CI module and associated internal buses in accordance with the present invention could be designed using any design technique, now known or hereafter developed, including custom design techniques.

Although a specific embodiment of the invention has been disclosed along with certain alternatives, it will be recognized by those skilled in the art that additional variations in form and detail may be made within the scope of the following claims:

What is claimed is:

1. A method for operating a communications bus, comprising the steps of:
   maintaining a local credit value in a sending device, said local credit value reflecting capacity of a receiving device to receive data;
   decrementing said local credit value in said sending device responsive to transmitting data to said receiving device;
   incrementing said local credit value in said sending device responsive to receiving a returned credit from said receiving device;
   maintaining at least one credit value independently of said local credit value, said at least one credit value maintained independently being associated with capacity of said receiving device to receive data, said at least one value maintained independently being being asynchronous with said local credit value in said sending device;
   comparing said at least one credit value maintained independently with said local credit value during at least one respective pre-defined time interval to detect agreement between said at least one credit value maintained independently and said local credit value occurring during said at least one respective pre-defined time interval;
   responsive to failure to detect agreement between one said at least one credit value maintained independently and said local credit value occurring during the respective pre-defined time interval, automatically taking at least one action to confirm whether a credit discrepancy exists, wherein said step of automatically taking at least one action to confirm whether a credit discrepancy exists comprises the steps of:
   (a) suspending at least some bus activity for a pre-defined suspension time interva, and
   (b) re-comprising at least one said at least one value maintained independently with said local credit value in said sending device at the conclusion of said pre-defined suspension time interval; and
   responsive to confirming a credit discrepancy, automatically reporting a credit discrepancy.

2. The method of claim 1,
   wherein said step of maintaining at least one credit value independently of said local credit value comprises maintaining a free credit value in said receiving device; and
   wherein said step of comparing at least one credit value maintained independently with said local credit value comprises comparing said free credit value with said local credit value during a first pre-defined time interval.

3. The method of claim 2,
   wherein said step of maintaining at least one credit value independently of said local credit value further comprises maintaining a maximum credit value in a configuration register; and
   wherein said step of comparing at least one credit value maintained independently with said local credit value further comprises comparing said maximum credit value with said local credit value during a second pre-defined time interval.

4. The method of claim 1, wherein said communications bus is a chip internal bus for communicating among two or more functional component modules of an integrated circuit chip.

5. The method of claim 4, wherein said integrated circuit chip is an I/O bridge device for a computer system having a plurality of I/O buses, and wherein at least some of said functional component modules comprise I/O bus interface modules.

6. The method of claim 4, wherein said integrated circuit chip comprises a plurality of communications buses coupled to respective functional component modules and a central interconnect module coupled to said plurality of communications buses, said plurality of communications buses and said central interconnect module forming a plurality of communications paths between pairs of said functional component modules.

7. The method of claim 1,
   wherein said bus comprises a command portion for transmitting commands and a data portion for transmitting data associated with the commands;
   wherein said sending device maintains a local command credit value and a separate local data credit value, said local command credit value and local data credit value reflecting capacity of the receiving device to receive commands on said command portion of said bus and data associated with commands on said data portion of said bus, respectively; and
   wherein said step of comparing said at least one credit value maintained independently with said local credit value comprises separately comparing at least one credit value maintained independently with said local command credit value and at least one credit value maintained independently with said local data credit value.

8. A communications apparatus for a digital data device, comprising:
   at least one communications bus;
   a plurality of components of said digital device coupled to said at least one communications bus, at least one of said plurality of components being a sending component capable of transmitting bus transactions on said at least one communications bus to at least one respective receiving component of said plurality of components;
   wherein each said at least one sending component maintains at least one respective local credit value, each local credit value maintained by a sending component corresponding to a respective receiving component, each said local credit value reflecting capacity of the corresponding respective receiving component to receive data from the respective sending component, each sending component being prevented from transmitting a bus transaction to a corresponding receiving component in the absence of sufficient local credit value corresponding to the receiving component, each local credit value being maintained by decrementing the respective local credit value corresponding to a receiving component responsive to transmitting a bus transaction to the corresponding receiving component, and by incrementing the respective local credit value corresponding to a receiving component responsive to receiving a returned credit from the corresponding receiving component;

a credit discrepancy detection mechanism which monitors at least one said local credit value by comparing each monitored local credit value with at least one independently maintained verification credit value corresponding to a local credit value, and reporting a credit discrepancy responsive to detecting a credit discrepancy;

wherein said at least one verification credit value comprises a free credit value maintained in the corresponding receiving component; and wherein said credit discrepancy detection mechanism compares said free credit value with a corresponding said local credit value during a first pre-defined time interval to detect agreement of said free credit value with the corresponding local credit value at any time during the first pre-determined time interval;

wherein said at least one verification credit value comprises a maximum credit value maintained in a configuration register; and wherein said credit discrepancy detection mechanism compares said maximum credit value with a corresponding said local credit value during a second pre-defined time interval to detect agreement of said maximum credit value with the corresponding local credit value at any time during the second pre-determined time interval.

9. The communications apparatus of claim 8,
wherein said credit discrepancy detection mechanism compares said at least one verification credit value with its corresponding local credit value during at least one respective pre-defined time interval to detect agreement between said at least one verification credit value and its corresponding local credit value occurring during said at least one respective pre-defined time interval, and confirms whether a credit discrepancy exists responsive to failure to detect agreement between of said at least one verification credit value and its corresponding local credit value.

10. The communications apparatus of claim 9, wherein said credit discrepancy detection mechanism confirms whether a credit discrepancy exists responsive to failure to detect agreement by suspending at least some bus activity for a pre-defined suspension time interval, and re-comparing at least one said at least one verification credit value with its corresponding local credit value at the conclusion of said pre-defined suspension time interval.

11. The communications apparatus of claim 8,
wherein said at least one communications bus comprises a command portion for transmitting commands and a data portion for transmitting data associated with the commands;

wherein each said at least one sending component maintains a local command credit value and a separate local data credit value, said local command credit value and local data credit value reflecting capacity of the corresponding receiving component to receive commands on said command portion of said bus and data associated with commands on said data portion of said bus, respectively; and wherein said credit discrepancy detection mechanism separately compares at least one local command credit value with a corresponding verification credit value and at least one local data credit value with a corresponding verification credit value.

12. An integrated circuit chip for a digital data device, comprising:

a plurality of functional component modules;

a central interconnect module;

a respective communications bus corresponding to each of said plurality of functional component modules, each respective communications bus connecting the corresponding functional component module with said central interconnect module, said communications buses and said central interconnect module forming a plurality of communications paths between respective different pairs of said plurality of functional component modules, each of said plurality of communications paths comprising a communications bus corresponding to a first functional component module of a respective one of said pairs of said plurality of functional component modules, said central interconnect module, and a communications bus corresponding to a second functional component module of the respective pair of functional component modules;

wherein each of a plurality of modules sending bus transactions on a communications bus maintains at least one respective local credit value, each local credit value maintained by a sending module corresponding to a respective receiving module, each said local credit value reflecting capacity of the corresponding respective receiving module to receive data from the respective sending module, each sending module being prevented from transmitting a bus transaction to a corresponding receiving module in the absence of sufficient local credit value corresponding to the receiving module, each local credit value being maintained by decrementing the respective local credit value corresponding to a receiving module responsive to transmitting a bus transaction to the corresponding receiving module, and by incrementing the respective local credit value corresponding to a receiving module responsive to receiving a returned credit from the corresponding receiving module; and a credit discrepancy detection mechanism which monitors at least one said local credit value by comparing each monitored local credit value with at least one independently maintained verification credit value corresponding to a local credit value, and reporting a credit discrepancy responsive to detecting a credit discrepancy;

wherein each said communications bus comprises a respective command portion for transmitting commands and a respective data portion for transmitting data associated with the commands;

wherein each sending module maintains a local command credit value and a separate local data credit value, said local command credit value and local data credit value reflecting capacity of the corresponding receiving module to receive commands on said command portion of said bus and data associated with commands on said data portion of said bus, respectively; and wherein said credit discrepancy detection mechanism separately compares at least one local command credit value with a corresponding verification credit value and at least one local data credit value with a corresponding verification credit value.

13. The integrated circuit chip of claim 12,
wherein said credit discrepancy detection mechanism compares said at least one verification credit value with its corresponding local credit value during at least one respective pre-defined time interval to detect agreement between said at least one verification credit value and its corresponding local credit value occurring during said at least one respective pre-defined time interval, and confirms whether a credit discrepancy exists responsive to failure to detect agreement between of said at least one verification credit value and its corresponding local credit value.

14. The integrated circuit chip of claim 13, wherein said credit discrepancy detection mechanism confirms whether a credit discrepancy exists responsive to failure to detect agreement by suspending at least some bus activity for a pre-defined suspension time interval, and re-comparing at least one said at least one verification credit value with its corresponding local credit value at the conclusion of said pre-defined suspension time interval.

15. The integrated circuit chip of claim 12,
wherein said at least one verification credit value comprises a free credit value maintained in the corresponding receiving module; and
wherein said credit discrepancy detection mechanism compares said free credit value with a corresponding said local credit value during a first pre-defined time interval to detect agreement of said free credit value with the corresponding local credit value at any time during the first pre-determined time interval.

16. The integrated circuit chip of claim 15,
wherein said at least one verification credit value comprises a maximum credit value maintained in a configuration register; and
wherein said credit discrepancy detection mechanism compares said maximum credit value with a corresponding said local credit value during a second pre-defined time interval to detect agreement of said maximum credit value with the corresponding local credit value at any time during the second pre-determined time interval.

* * * * *